US010080996B2

(12) United States Patent
Berzinis et al.

(10) Patent No.: US 10,080,996 B2
(45) Date of Patent: Sep. 25, 2018

(54) SKINNED, ASYMMETRIC POLY(PHENYLENE ETHER) CO-POLYMER MEMBRANE; GAS SEPARATION UNIT, AND PREPARATION METHOD THEREOF

(71) Applicant: SABIC GLOBAL TECHNOLOGIES B.V., Bergen op Zoom (NL)

(72) Inventors: Albin Peter Berzinis, Delmar, NY (US); Rachel Elizabeth Halbfinger, Glenville, NY (US); Matias Bikel, Bergen op Zoom (NL); Pooja Bajaj, Schenectady, NY (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/303,562

(22) PCT Filed: Apr. 30, 2015

(86) PCT No.: PCT/US2015/028492
§ 371 (c)(1),
(2) Date: Oct. 12, 2016

(87) PCT Pub. No.: WO2015/168392
PCT Pub. Date: Nov. 5, 2015

(65) Prior Publication Data
US 2017/0021311 A1    Jan. 26, 2017

Related U.S. Application Data

(60) Provisional application No. 61/987,141, filed on May 1, 2014.

(51) Int. Cl.
*B01D 71/52* (2006.01)
*B01D 53/22* (2006.01)
(Continued)

(52) U.S. Cl.
CPC .......... *B01D 71/52* (2013.01); *B01D 53/228* (2013.01); *B01D 63/021* (2013.01); *B01D 63/08* (2013.01);
(Continued)

(58) Field of Classification Search
CPC ............ B01D 53/228; B01D 2053/224; B01D 63/021; B01D 63/08; B01D 63/10;
(Continued)

(56) References Cited

U.S. PATENT DOCUMENTS 3,446,856 A    3/1969 Hamilton
3,522,326 A    7/1970 Bostick et al.
(Continued)

FOREIGN PATENT DOCUMENTS

CN    103007787 A    4/2013
CN    103170259 B    12/2014
(Continued)

OTHER PUBLICATIONS

CN 103170259; Machine Translation; Date of Publication: Dec. 10, 2014; 10 pages.
(Continued)

*Primary Examiner* — Jason M Greene
(74) *Attorney, Agent, or Firm* — Cantor Colburn LLP

(57) ABSTRACT

An asymmetric membrane having a substantially non-porous surface layer is made by a method including: dissolving a poly(phenylene ether) copolymer in a solvent mixture including a first solvent and a second solvent to provide a membrane-forming composition; and phase-inverting the membrane forming composition in a first non-solvent to form the membrane comprising a substantially non-porous surface layer. The first solvent is a water-miscible polar aprotic solvent, and the second solvent is a polar solvent having two to eight carbon atoms.

21 Claims, 7 Drawing Sheets

(51) Int. Cl.
  *B01D 67/00* (2006.01)
  *B01D 63/02* (2006.01)
  *B01D 63/08* (2006.01)
  *B01D 69/08* (2006.01)
  *B01D 63/10* (2006.01)
  *B01D 69/06* (2006.01)
  *B01D 71/76* (2006.01)
  *B01D 69/02* (2006.01)

(52) U.S. Cl.
  CPC ......... *B01D 63/10* (2013.01); *B01D 67/0016* (2013.01); *B01D 69/02* (2013.01); *B01D 69/06* (2013.01); *B01D 69/08* (2013.01); *B01D 71/76* (2013.01); *B01D 2053/224* (2013.01); *B01D 2323/06* (2013.01); *B01D 2323/22* (2013.01); *B01D 2325/023* (2013.01)

(58) Field of Classification Search
  CPC ............... B01D 67/0009; B01D 67/0016; B01D 69/02; B01D 69/06; B01D 69/08; B01D 69/087; B01D 71/52; B01D 71/76; B01D 2323/06; B01D 2323/22; B01D 2325/022; B01D 2323/023
  See application file for complete search history.

(56) References Cited

U.S. PATENT DOCUMENTS

| | | | |
|---|---|---|---|
| 3,703,564 A | 11/1972 | White | |
| 3,770,699 A | 11/1973 | White | |
| 3,970,640 A | 7/1976 | Yonemitsu et al. | |
| 4,201,880 A | 5/1980 | Van Sorge | |
| 4,277,344 A | 7/1981 | Cadotte | |
| 4,278,777 A | 7/1981 | Jakabhazy et al. | |
| 4,338,421 A | 7/1982 | Maruyama et al. | |
| 4,454,284 A | 6/1984 | Ueno et al. | |
| 4,622,206 A | 11/1986 | Torgeson | |
| 4,882,168 A | 11/1989 | Casey et al. | |
| 4,933,081 A | 6/1990 | Sasaki et al. | |
| 4,944,775 A | 7/1990 | Hayes | |
| 5,069,793 A * | 12/1991 | Kaschemekat ......... B01D 63/10 210/247 |
| 5,118,327 A | 6/1992 | Nelson et al. | |
| 5,128,421 A | 7/1992 | Ohmura et al. | |
| 5,132,363 A | 7/1992 | Furuta et al. | |
| 5,159,027 A | 10/1992 | Kanayama et al. | |
| 5,209,849 A | 5/1993 | Hu et al. | |
| 5,282,964 A | 2/1994 | Young et al. | |
| 5,385,976 A | 1/1995 | Furuta et al. | |
| 5,480,552 A | 1/1996 | Soltys et al. | |
| 5,527,467 A | 6/1996 | Oftshun et al. | |
| 5,643,968 A | 7/1997 | Andreola et al. | |
| 5,795,920 A * | 8/1998 | Kang ................... B01D 69/08 210/500.39 |
| 5,834,583 A | 11/1998 | Hancock et al. | |
| 6,294,499 B1 | 9/2001 | Watson et al. | |
| 6,437,084 B1 | 8/2002 | Birsak et al. | |
| 6,472,499 B1 | 10/2002 | Braat et al. | |
| 7,166,148 B2 | 1/2007 | Lyons et al. | |
| 7,208,438 B2 | 4/2007 | Ingelbrecht et al. | |
| 8,222,342 B2 | 7/2012 | Weber et al. | |
| 8,287,735 B2 | 10/2012 | Hanemaaijer et al. | |
| 8,302,781 B2 | 11/2012 | Wechs et al. | |
| 8,505,745 B2 | 8/2013 | Mayes et al. | |
| 8,602,221 B2 | 12/2013 | Mizomoto et al. | |
| 8,727,136 B2 | 5/2014 | Ansorge et al. | |
| 8,741,600 B2 | 6/2014 | Yamaguchi et al. | |
| 9,133,338 B2 | 9/2015 | Yang et al. | |
| 2004/0145127 A1 | 7/2004 | Pinto | |
| 2004/0149127 A1 | 8/2004 | Lyons et al. | |
| 2004/0231663 A1 | 11/2004 | Carter et al. | |
| 2005/0218057 A1 | 10/2005 | Ngee | |
| 2006/0076884 A1 | 4/2006 | Ahn | |
| 2006/0076885 A1 | 4/2006 | Kim et al. | |
| 2006/0137522 A1 | 6/2006 | Nishimura et al. | |
| 2007/0068871 A1 | 3/2007 | Flynn | |
| 2007/0202374 A1 | 8/2007 | Bridges et al. | |
| 2007/0238832 A1 | 10/2007 | Borade et al. | |
| 2008/0076884 A1 | 3/2008 | Yeager et al. | |
| 2008/0076885 A1 | 3/2008 | Yeager et al. | |
| 2008/0085989 A1 | 4/2008 | Yeager et al. | |
| 2008/0142429 A1 | 6/2008 | Zhang et al. | |
| 2008/0203012 A1 | 8/2008 | Yeager et al. | |
| 2008/0207822 A1 | 8/2008 | Yeager et al. | |
| 2008/0312349 A1 * | 12/2008 | Yeager ............... B01D 67/0009 521/27 |
| 2009/0018303 A1 | 1/2009 | Onizuka et al. | |
| 2010/0244306 A1 | 9/2010 | Tang | |
| 2012/0100904 A1 | 5/2012 | Morita et al. | |
| 2012/0103904 A1 | 5/2012 | Morita et al. | |
| 2012/0277347 A1 | 11/2012 | Bedner et al. | |
| 2012/0305486 A1 | 12/2012 | Storr et al. | |
| 2013/0220924 A1 | 8/2013 | Maeda | |
| 2016/0008528 A1 | 1/2016 | Roy et al. | |
| 2016/0021191 A1 | 1/2016 | Wang et al. | |
| 2016/0022892 A1 | 1/2016 | Eifler et al. | |
| 2016/0079616 A1 * | 3/2016 | Lee ................... B01D 53/228 210/321.88 |
| 2017/0282131 A1 | 10/2017 | Berzinis et al. | |
| 2018/0079863 A1 | 3/2018 | Ghanta | |

FOREIGN PATENT DOCUMENTS

| | | |
|---|---|---|
| EP | 0216633 | 4/1987 |
| EP | 0568045 A1 | 11/1993 |
| EP | 0083489 B1 | 4/1999 |
| EP | 1918019 A1 | 5/2008 |
| EP | 2535101 A1 | 12/2012 |
| JP | S42004276 B | 2/1964 |
| JP | S46002837 B | 10/1967 |
| JP | S46006542 | 12/1971 |
| JP | S60114323 A | 6/1985 |
| JP | S62057915 | 3/1987 |
| JP | S62071503 A | 4/1987 |
| JP | S62152507 A | 7/1987 |
| JP | S63100916 A | 5/1988 |
| JP | S63128021 A | 5/1988 |
| JP | S63197502 | 8/1988 |
| JP | S63218231 A | 9/1988 |
| JP | S63230173 A | 9/1988 |
| JP | H03065227 A | 3/1991 |
| JP | H04011927 | 1/1992 |
| JP | H0843699 A | 6/1996 |
| JP | S64030621 | 2/1999 |
| JP | H11156165 A | 6/1999 |
| JP | H11322921 A | 11/1999 |
| JP | 2000246064 A | 9/2000 |
| JP | 2004231743 A | 8/2004 |
| JP | 2005262211 A | 9/2005 |
| JP | 2013013838 A | 1/2013 |
| JP | 2014205761 A | 10/2014 |
| WO | 0240140 A1 | 5/2002 |
| WO | 03000389 A2 | 1/2003 |
| WO | 2004056459 A1 | 7/2004 |
| WO | 2005107929 A2 | 11/2005 |
| WO | WO 2008036454 A1 | 3/2008 |
| WO | 2008103599 A2 | 8/2008 |
| WO | 2012000837 A2 | 1/2012 |
| WO | 2013131848 A1 | 9/2013 |
| WO | 2014195234 A1 | 12/2014 |
| WO | 2015168409 A1 | 11/2015 |
| WO | 2015168414 A1 | 11/2015 |
| WO | 2015168418 A1 | 11/2015 |
| WO | 2015168423 A1 | 11/2015 |
| WO | 2015168584 A1 | 11/2015 |
| WO | 2015168592 A1 | 11/2015 |
| WO | 2016178835 A1 | 11/2016 |

OTHER PUBLICATIONS

Final Office Action dated Jun. 7, 2017; U.S. Appl. No. 15/356,836, filed Nov. 21, 2016; 16 pages.

(56) References Cited

OTHER PUBLICATIONS

International Search Report for International Application No. PCT/US2016/028951; International Filing Date Apr. 22, 2016; dated Jul. 29, 2016; 7 pages.
International Search Report for International Application No. PCT/US2017/022061; Date of Filing: Mar. 13, 2017; dated Jul. 4, 2017; 6 pages.
International Search Report for International Application No. PCT/US2017/022088; Date of Filing: Mar. 13, 2017; dated Jun. 28, 2017; 6 pages.
JP S60114323; Machine Translation; Date of Publication: Jun. 20, 1985; 8 pages.
Loh et al.; "Fabrication of high performance polyethersulfone UF hollow fiber membranes using amphiphilic Pluronic block copolymers as pore-forming additives"; J. Membr. Sci., vol. 380; 2011; 114-123.
Non-Final Office Action dated Feb. 16, 2017; U.S. Appl. No. 15/356,836, filed Nov. 21, 2016; 24 pages.
Non-Final Office Action dated Mar. 6, 2017; U.S. Appl. No. 15/356,854, filed Nov. 21, 2016; 28 pages.
Susanto et al.; "Characteristics, performance and stability of polyethersulfone ultrafiltration membranes prepared by phase separation method using different macromolecular additives"; J. Membr. Sci., vol. 327; 2009; p. 125-135.
U.S. Appl. No. 15/356,836 to Berzinis; filed with the USPTO on Nov. 21, 2016; 29 pages.
U.S. Appl. No. 15/356,854 to Berzinis; filed with the USPTO on Nov. 21, 2016; 38 pages.
U.S. Appl. No. 62/155,593 to Berzinis; filed with the USPTO on May 1, 2015; 36 pages.
Written Opinion of the International Search Report for International Application No. PCT/US2016/028951; International Filing Date Apr. 22, 2016; dated Jul. 29, 2016; 9 pages.
Written Opinion of the International Searching Authority for International Application No. PCT/US2017/022061; Date of Filing: Mar. 13, 2017; dated Jul. 4, 2017; 9 pages.
Written Opinion of the International Searching Authority for International Application No. PCT/US2017/022088; Date of Filing: Mar. 13, 2017; dated Jun. 28, 2017; 8 pages.
Asatekin et al.; "Anti-fouling ultrafiltration membranes containing polyacrylonitrile-graft-poly(ethylene oxide) comb copolymer additives"; Journal of Membrane Science 298 (2007) pp. 136-146.
ATRP Solutions; 2011 Catalog; 9 pages.
Baker; "Membranes and Modules"; Membrane Technology & Applications, Third Edition; 2012 John Wiley & Sons; pp. 97-178.
Bernardo et al.; "Membrane Gas Separation: A Review/State of the Art"; Ind. Eng. Chem. Res. 2009, 48, pp. 4638-4663.
Chung et al.; "Formation of ultrathin high-performance polyethersulfone hollow-fiber membranes"; Journal of Membrane Science 133 (1997) pp. 161-175.
Cooper et al.; "Preparation and Properties of Poly(arylene oxide) Copolymers"; Advances in Chemistry; American Chemical Society; 1973; pp. 230-257.
Cooper et al.; "Preparation and Properties of Polyarylene Oxide Copolymers"; 1973; pp. 551-556.
Dongliang et al.; "Polyethersulfone hollow fiber gas separation membranes prepared from NMP/alcohol solvent systems"; Journal of Membrane Science; 115; 1996, pp. 85-108.
International Search Report for International Application No. PCT/US2015/028492, International Filing Date Apr. 30, 2015, dated Jul. 27, 2015, 5 Pages.
Kang et al.; "Protein antifouling mechanisms of PAN UF membranes incorporating PAN-g-PEO additive"; Journal of Membrane Science 296 (2007) pp. 42-50.
Kim et al.; "Ultrafiltration membranes prepared from blends of polyethersulfone and poly(1-vinylpyrrolidone-co-styrene) copolymers"; Journal of Membrane Science 262 (2005) pp. 60-68.
Liang et al.; "Synthesis and characterization of poly(phenylene oxide) graft copolymers by atom transfer radical polymerizations"; European Polymer Journal 45 (2009) pp. 2348-2357.

Petersen; "Composite reverse osmosis and nanofiltration membranes"; Journal of Membrane Science, 83 (1993) pp. 81-150.
Semsarzadeh et al.; "Synthesis and Characterization of Poly(phenylene oxide)-Based Block Copolymers via Cobalt Mediated Radical Polymerization (CMRP)"; Silicon; 6, 2014, pp. 27-34.
Smid et al.; "The formation of asymmetric hollow fibre membranes for gas separation, using PPE of different intrinsic viscosities"; Journal of Membrane Science, 64, 1991, pp. 121-128.
Ulbricht, "Advanced functional polymer membranes", Polymer; 47; Jan. 2006; pp. 2217-2262.
Vandezande et al.; "High throughput study of phase inversion parameters for polyimide-based SRNF membranes"; Journal of Membrane Science, 330, 2009, pp. 307-318.
Wang et al.; "Highly permeable polyethersulfone hollow fiber gas separation membranes prepared using water as non-solvent additive"; Journal of Membrane Science 176 (2000) pp. 147-158.
Wang et al.; "Polyethersulfone hollow fiber gas separation membranes prepared from NMP/alcohol solvent systems"; Journal of Membrane Science 115 (1996) pp. 85-108.
Written Opinion for International Application No. PCT/US2015/028492, International Filing Date Apr. 30, 2015, dated Jul. 27, 2015, 10 pages.
Yang et al.; "Tailoring pore size and pore size distribution of kidney dialysis hollow fiber membranes via dual-bath coagulation approach"; Journal of Membrane Science 290 (2007) pp. 153-163.
Yeager et al.; "Polyethers, Aromatic"; Encyclopedia of Polymer Science and Technology; vol. 11; John Wiley & Sons; 2003; pp. 64-87.
U.S. Appl. No. 15/303,562, filed Oct. 12, 2016, US2017/0021311, WO2015/168392.
U.S. Appl. No. 15/303,561, filed Oct. 12, 2016, US2017/0037177, WO2015/168409.
U.S. Appl. No. 15/303,556, filed Oct. 12, 2016, US2017/0043301, WO2015/168414.
U.S. Appl. No. 15/303,058, filed Oct. 10, 2016, US2017/0036169, WO2015/168418.
U.S. Appl. No. 15/303,061, filed Oct. 10, 2016, US2017/0043297, WO2015/168592.
U.S. Appl. No. 15/302,276, filed Oct. 6, 2016, US2017/0056835, WO2015/168423.
U.S. Appl. No. 15/302,323, filed Oct. 6, 2016, US2017/0021310, WO2015/168584.
U.S. Appl. No. 15/356,836, filed Nov. 21, 2016.
U.S. Appl. No. 15/356,854, filed Nov. 21, 2016,
U.S. Appl. No. 62/155,593, filed May 1, 2015, WO2016/178835.
Machine Translation for JPH011322921A.
Advisory Action dated Aug. 8, 2017 for U.S. Appl. No. 15/536,836; 4 pages.
International Preliminary Report on Patentability for International Application No. PCT/US2016/028951; Date of Filing: Apr. 22, 2016; dated Aug. 7, 2017; 57 pages.
Machine Translation for JPH08143699.
Machine Translation for JPS46006542.
Machine Translation for JPS62152507A.
Non-Final Office Action dated Jan. 4, 2018 for U.S. Appl. No. 15/536,836; 11 Pages.
U.S. Notice of Allowance, U.S. Appl. No. 15/356,854, dated Aug. 16, 2017, 16 pages.
Written Opnion of the International Searching Authority for International Application No. PCT/US2016/028951; Date of Filing: Apr. 22, 2016; dated Apr. 11, 2017; 10 pages.
Non-Final Office Action for U.S. Appl. No. 15/303,556; dated May 3, 2018; 30 pages.
Restriction Requirement for U.S. Appl. No. 15/302,323 dated Apr. 30, 2018; 8 pages.
Restriction Requirement for U.S. Appl. No. 15/303,058; dated May 1, 2018; 8 pages.
Restriction Requirement for U.S. Appl. No. 15/303,161; dated May 4, 2018; 8 pages.
Restriction Requirement for U.S. Appl. No. 15/303,561; dated Apr. 27, 2018; 10 pages.
Restriction Requirement for U.S. Appl. No. 15/303,061 dated May 4, 2018; 8 pages.

(56) References Cited

OTHER PUBLICATIONS

Restriction Response for U.S. Appl. No. 15/302,276; dated Apr. 23, 2018: 8 pages.
Final Office Action for U.S. Appl. No. 15/356,836 dated Apr. 20, 2018, 22 pages.
Machine Translation for JPH08143699A obtained from Espacenet on Jan. 12, 2018, 10 pages; (https://worldwide.espacenet.com/publicationDetails/biblio?II=0&ND=3&adjacent=true&locate=en_EP&FT=D&date=19960604&CC=JP&NR=H08143699A&KC=A#).
Machine Translation for JPS4665420A obtained from J-Plat Pat on Jan. 8, 2018, 14 pages; (https://www4.j-platpat.inpit.go.jp/cgi-bin/tran_web_cgi_ejje?u=http://www4.j-platpat.input/go/jp/eng/translation/20180424050647402376855621217410 56C2CF07F06D8BF80D-AC7BA11D51D95A0).
Machine Translation for JPS62152507A obtained from Espacenet on Jan. 12, 2018, 11 pages; (https://worldwide/espacenet.com/publicationDetails/biblio?II=0&ND=3&adjacent=true&locale=en_EP&FT=D&date=19870707&CC=JP&NR=S62152507A&KC=A#).
Non Final Office Action for U.S. Appl. No. 15/303,561; dated Jul. 26, 2018; 16 pages.
Advisory Action for U.S. Appl. No. 15/356,836; dated Jul. 3, 2018; 9 Pages.
Li et al "Water Treatment and Water Quality Control of Power Station"; China Electric Power Press; 2012; pp. 203-204.
Li et al "Water Treatment and Water Quality Control of Power Station"; China Electric Power Press; 2012; pp. 203-204 (Original in Chinese).
Non Final Office Action for U.S. Appl. No. 15/303,061; dated Jul. 19, 2018; 53 pages.
Non-Final Office Action for U.S. Appl. No. 15/302,276; dated Jul. 19, 2018; 45 pages.
Non-Final Office Action for U.S. Appl. No. 15/303,058; dated Jul. 19, 2018; 51 pages.
Non-Final Office Action for U.S. Appl. No. 15/303/058; dated Jul. 19, 2018; 56 pages.
Shi et al., Ed,, "Membrane Technology Manual"; Chemical Industry Press; 2001; p. 199. (Original in Chinese).
Shi et al., Ed., "Membrane Technology Manual"; Chemical Industry Press; 2001; p. 199.
Wang, Ed. "Biomedical Engineering Principles"; Science Press; 1982; p. 326. (Original in Chinese).
Wang, Ed. "Biomedical Engineering Principles"; Science Press; 1982; p. 326.
Wang, Ed., "Membrane Separation Technology and Use Thereof"; Science Press; 1994; p. 181. (Original in Chinese).
Wang, Ed., "Membrane Separation Technology and Use Thereof"; Science Press; 1994; p. 181.
Zhong et al., Ed., "Principle of Chemical Industry"; National Defense Industry Press; 2013; p. 399 (Original in Chinese).
Zhong et al., Ed., "Principle of Chemical Industry"; National Defense Industry Press; 2013; p. 399.

* cited by examiner

SEM OF MEMBRANE SURFACES:

SKINNED, ASYMMETRIC POLY(PHENYLENE ETHER) CO-POLYMER MEMBRANE; GAS SEPARATION UNIT, AND PREPARATION METHOD THEREOF

CROSS REFERENCE TO RELATED APPLICATIONS

This application is a National Stage application of PCT/US2015/028492, filed Apr. 30, 2015, which claims the benefit of U.S. Provisional Application No. 61/987,141, filed May 1, 2014, both of which are incorporated by reference in their entirety herein.

BACKGROUND OF THE INVENTION

Asymmetric polymer membranes can be used for gas separation, for example for the production of oxygen-enriched air, production of nitrogen-enriched streams for blanketing fuels and petrochemicals, separation of carbon dioxide or hydrogen sulfide from methane in natural gas, hydrogen recovery from ammonia plant purge streams, and removal of organic vapor from air or nitrogen. Semi-permeable asymmetric "skinned" gas separation membranes can be formed by phase inversion and solvent exchange methods. Such membranes are characterized as "asymmetric" because they comprise a thin, dense, selectively semi-permeable surface "skin" and a less dense void-containing, non-selective support region. In the support region, pore sizes range from large in the support region to very small proximate to the non-porous and selectively semi-permeable "skin."

A commercially viable gas separation membrane combines high selectivity for the desired gas, high permeation flux, or throughput, and a long service life. Permeation flux is a measure of volumetric gas flow through a membrane. The higher the permeation flux, the smaller the membrane area required to treat a given volume of gas. Separation factor is a measure of membrane selectivity for the gas pair to be separated. It is the ratio of the fluxes of the individual gases across the membrane. For example, for oxygen/nitrogen separations, the separation factor is the ratio of oxygen flux to nitrogen flux. Since selectivity can be inversely proportional to flux, it is desirable to increase the selectivity without adversely affecting flux. Selectivity is proportional to skin thickness, but flux is inversely proportional to skin thickness. Therefore, it is desirable to increase selectivity without increasing skin thickness. It is also desirable to have gas separation membranes with long service lives under harsh conditions, for example high temperatures and exposure to corrosive gases, so that replacement costs are minimized. A large number of materials have been investigated for use in gas separation membranes. It is desirable to develop new materials that will improve selectivity without increasing skin thickness and permeation flux. It is also desirable to develop gas separation membranes with long service lives under harsh conditions.

Gas separation membranes can be formed by phase separation of solutions of polymer in solvent mixtures. The thickness, permeability, and permeation flux of the skin can be in part controlled by the choice of cosolvent. Toward this end, the solvent mixture can include a polar solvent comprising 2 to 8 carbon atoms. It is desirable to use a co-solvent other than 2-ethylhexanol. The cosolvent should be easier to remove by evaporation, and should provide gas separation membranes with advantageous skin properties of high selectivity and high flux.

BRIEF DESCRIPTION OF THE INVENTION

An asymmetric membrane having a substantially non-porous surface layer is made by a method comprising: dissolving a poly(phenylene ether) copolymer having an intrinsic viscosity of 0.7 to 1.5 deciliters per gram, measured in chloroform at 25° C., in a solvent mixture comprising a first solvent and a second solvent to provide a membrane-forming composition; phase-inverting the membrane forming composition in a first non-solvent to form the membrane comprising a substantially non-porous surface layer; wherein the first solvent is a water-miscible polar aprotic solvent, and the second solvent is a polar solvent having two to eight carbon atoms. A gas separation module comprises the asymmetric membrane.

A method of forming the asymmetric membrane having a non-porous surface layer comprises: dissolving a poly(phenylene ether) copolymer in a solvent mixture comprising a first solvent and a second solvent to make a membrane forming composition; wherein the poly(phenylene ether) copolymer has an intrinsic viscosity of 0.7 to 1.5 deciliters per gram, measured in chloroform at 25° C.; wherein the first solvent is a water-miscible polar aprotic solvent, and the second solvent is a polar solvent having two to eight carbon atoms; and phase inverting the membrane forming composition in a first non-solvent to form the membrane.

BRIEF DESCRIPTION OF THE DRAWINGS

The following drawings are non-limiting.

DETAILED DESCRIPTION OF THE INVENTION

Figure 1A:
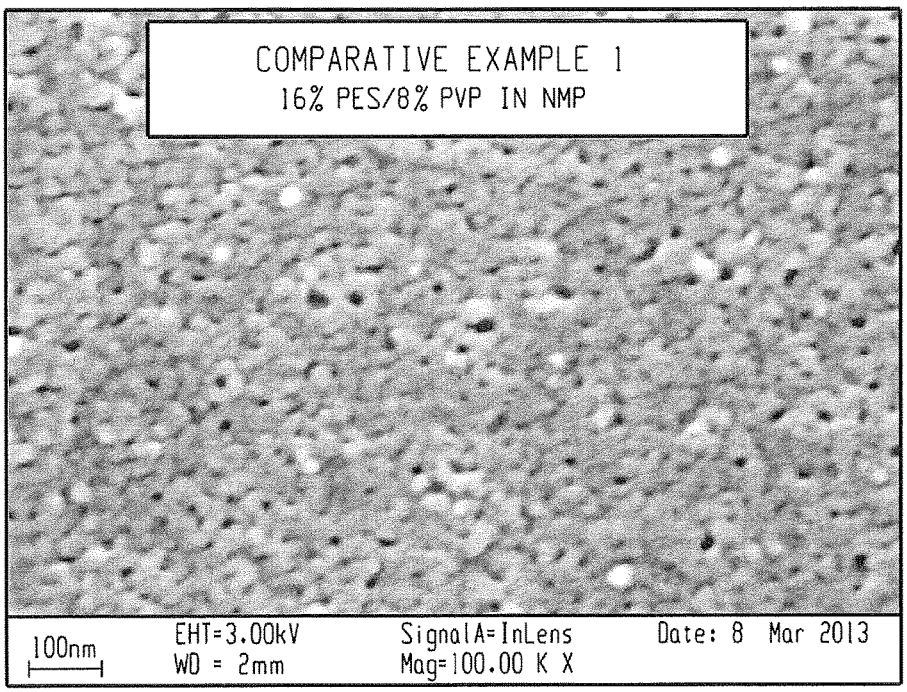
FIG. 1 shows scanning electron microscopy (SEM) images of the asymmetric membrane surfaces and cross-sections of Comparative Examples 1 and 2. The images, clockwise from the upper left corner are of the surface of Comparative Example 1, the surface of Comparative Example 2, cross-sections of Comparative Example 2, and cross-sections of Comparative Example 1.
Figure 1A:
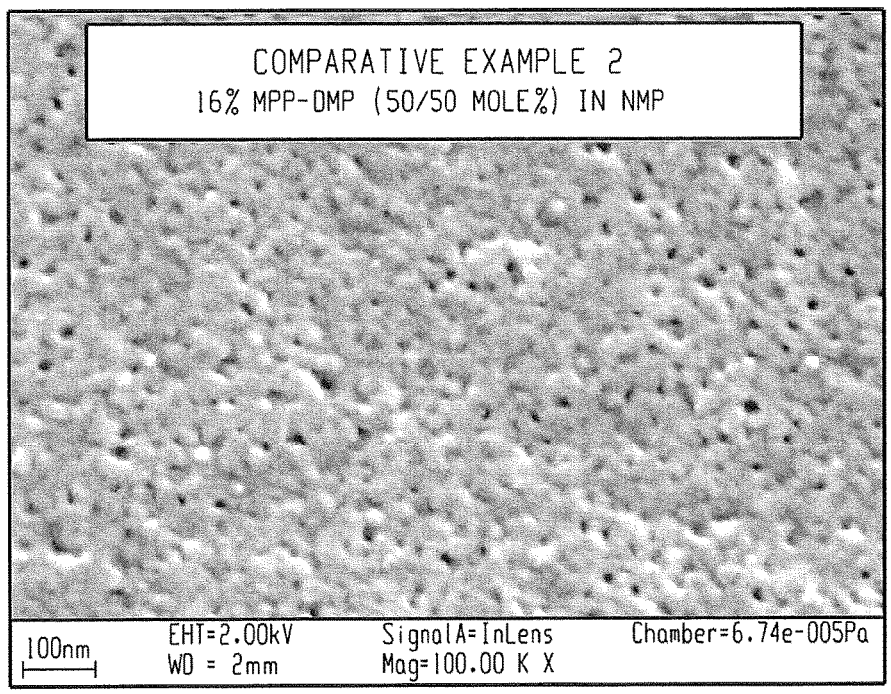
Figure 1B:
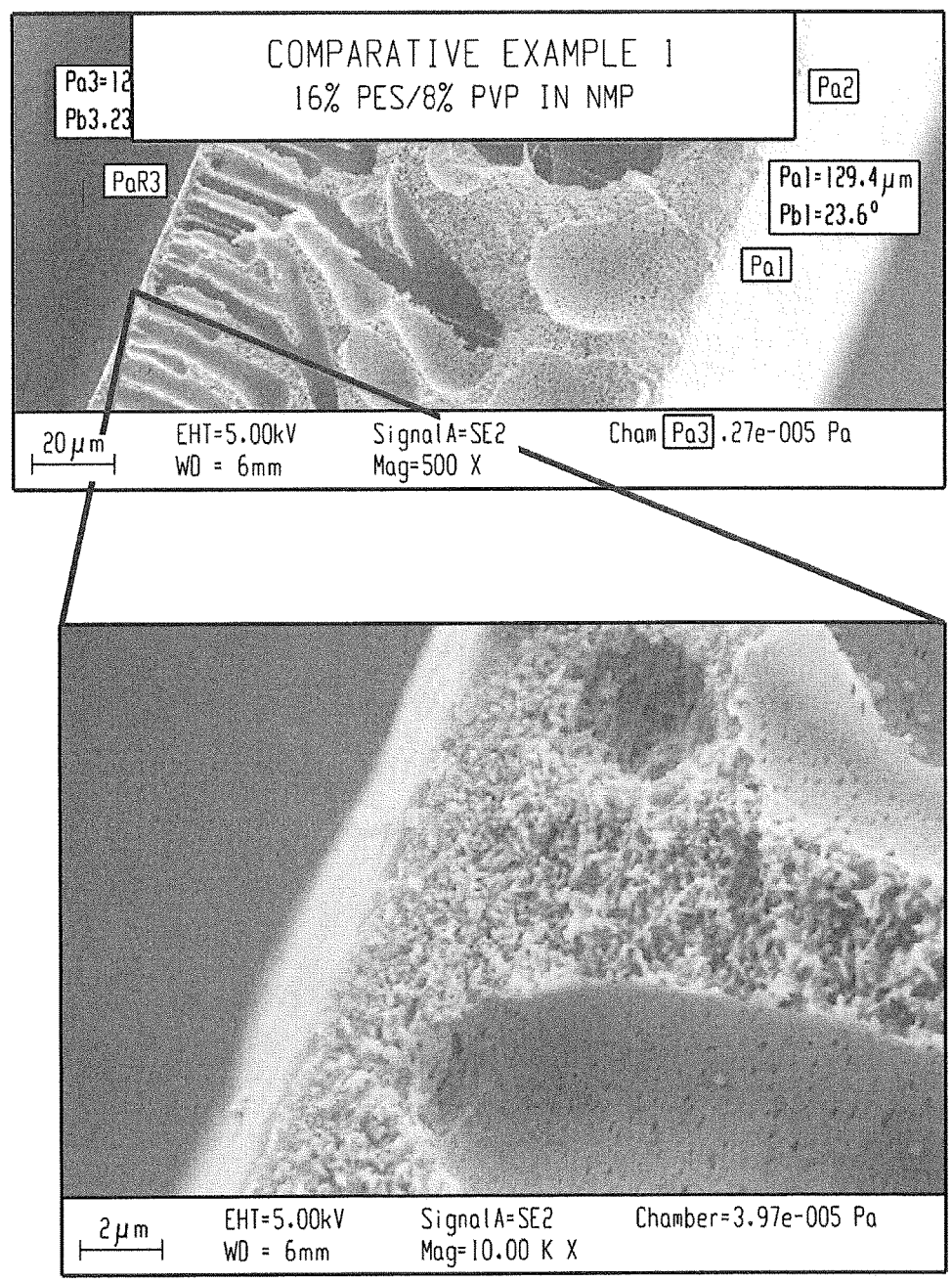
Figure 1C:
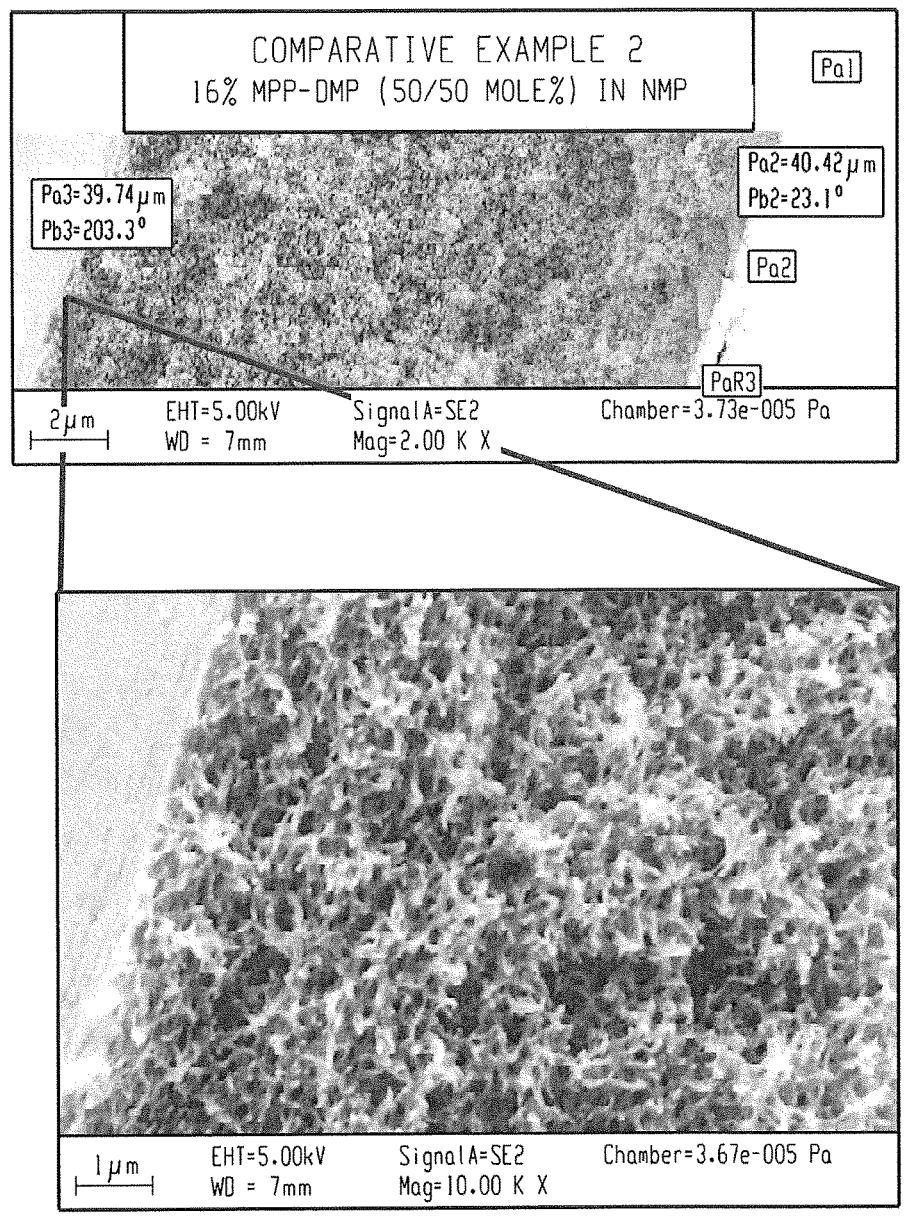

Poly(phenylene ether)s are a class of plastics known for excellent water resistance, dimensional stability, dielectric properties, and inherent flame resistance. The inventors have prepared poly(phenylene ether) copolymers having a high intrinsic viscosity for use in the manufacture of asymmetric membranes that have a non-porous surface layer, or skin covering pores present in the membrane. The membranes are particularly useful for gas separation.

As used herein, "substantially non-porous surface layer" means that at least 80%, at least 85%, preferably at least 90%, and most preferably 95% to 100% of a surface of the membrane is contiguous, that is, solid and without openings greater than 1 nanometer in diameter, and more preferably without openings greater than 0.5 nanometer in diameter. In another embodiment, "substantially non-porous surface layer" means that of the pores present in a membrane, at least 80%, at least 85%, at least 90%, and preferably at 95% to 100% of the pores are closed by the presence of a surface skin. The thickness of the surface skin (i.e., the thickness of the skin covering the pores) can vary depending on the method of forming the membrane as described below. In some embodiments, the apparent thickness of the skin as determined by scanning electron microscopy (SEM) can be 0.1 to 10 micrometers, specifically 0.2 to 5 micrometers, or more specifically 0.5 to 2 micrometers. In other embodiments, the skin can have a thickness that represents 1 to 50%, 5 to 40%, or 10 to 30% of the total thickness of the membrane.

The poly(phenylene ether) copolymer used to form the membranes comprises 80 to 20 mole percent repeat units derived from 2,6-dimethylphenol; and 20 to 80 mole percent repeat units derived from a first monohydric phenol having the structure

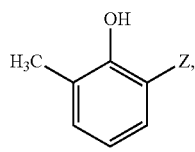

wherein Z is $C_1$-$C_{12}$ alkyl or cycloalkyl, or a monovalent radical having the structure

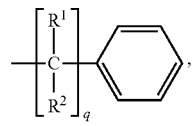

wherein q is 0 or 1, and $R^1$ and $R^2$ are independently hydrogen or $C_1$-$C_6$ alkyl. The first monohydric phenol can comprise, for example, 2-methyl-6-phenylphenol. In some embodiments, the first monohydric phenol is 2-methyl-6-phenylphenol.

The hydrophobic polymer can be a poly(phenylene ether) copolymer having an intrinsic viscosity greater than or equal to 0.7, 0.8, 0.9, 1.0, or 1.1 deciliters per gram, and less than or equal to 1.5, 1.4, or 1.3 deciliters per gram, when measured in chloroform at 25° C. In some embodiments, the intrinsic viscosity is 1.1 to 1.3 deciliters per gram.

In some embodiments, the poly(phenylene ether) copolymer has a weight average molecular weight of 100,000 to 500,000 daltons (Da), as measured by gel permeation chromatography against polystyrene standards. Within this range, the weight average molecular weight can be greater than or equal to 150,000 or 200,000 Da and less than or equal to 400,000, 350,000, or 300,000 Da. In some embodiments, the weight average molecular weight is 100,000 to 400,000 Da, specifically 200,000 to 300,000 Da. The poly (phenylene ether) copolymer can have a polydispersity (ratio of weight average molecular weight to number average molecular weight of 3 to 12. Within this range, the polydispersity can be greater than or equal to 4 or 5 and less than or equal to 10, 9, or 8.

The asymmetric membrane having a substantially non-porous surface layer can be formed by a process comprising: dissolving the poly(phenylene ether) copolymer in a solvent mixture comprising a first solvent and a second solvent to make a membrane-forming composition; phase inverting the membrane forming composition in a first non-solvent to form the membrane; optionally washing the membrane in a second non-solvent; and drying the membrane.

The first solvent is a water-miscible polar aprotic solvent. The first solvent can be, for example, N,N-dimethylformamide (DMF); N,N-dimethylacetamide (DMAC); N-methyl-2-pyrrolidinone (NMP); dimethyl sulfoxide (DMSO); dimethyl sulfone, sulfolane; and combinations comprising at least one of the foregoing. In some embodiments, the first solvent is N-methyl-2-pyrrolidinone. The solubility of the poly(phenylene ether) copolymer in the water-miscible polar aprotic solvent can be 50 to 400 grams per kilogram at 25° C., based on the combined weight of the poly(phenylene ether) copolymer and the solvent. Within this range, the solubility can be greater than or equal to 100, 120, 140, or 160 grams per kilogram, and less than or equal to 300, 250, 200, or 180 grams per kilogram at 25° C. Advantageously, a poly(phenylene ether) copolymer solubility of 50 to 400 grams per kilogram provides membrane-forming compositions conducive to the formation of membranes having a non-porous surface layer.

The second solvent can be water, a polar solvent having two to eight carbon atoms, or a combination comprising at least one of the foregoing. The second solvent can be, for example, water, a $C_1$-$C_8$ alcohol, a $C_4$-$C_8$ ether, a $C_3$-$C_8$ ketone, a $C_3$-$C_8$ ester, a $C_2$-$C_8$ alkyl cyanide, or a combination comprising at least one of the foregoing. Specific solvents include methanol, ethanol, isopropanol, 1-propanol, 1-butanol, 1-pentanol, ethylene glycol, diethylene glycol, 2-methoxyethanol, tetrahydrofuran, 2-methyltetrahydrofuran, dioxolane, dioxane, acetone, methyl ethyl ketone, methyl isobutyl ketone, methyl acetate, ethyl acetate, methyl propionate, acetonitrile, or a combination comprising at least one of the foregoing. The second solvent can be, for example, tetrahydrofuran (THF).

Advantageously, the second solvent provides a membrane-forming composition close to its gel point at the phase inversion temperature. Although absent from the asymmetric membrane itself, the use of the second solvent in the membrane-forming composition provides the substantially non-porous surface layer, which is selectively semi-permeable to gases. In the absence of the second solvent, a substantially non-porous surface layer does not form. For example, membrane-forming compositions can comprise a first solvent, NMP, but not a second solvent as defined herein. FIG. 1 depicts scanning electron microscopy (SEM) images of the asymmetric membrane surfaces and cross-sections of Comparative Examples 1 and 2. The images, clockwise from the upper left corner are of the surface of Comparative Example 1, the surface of Comparative Example 2, cross-sections of Comparative Example 2, and cross-sections of Comparative Example 1. These membranes were both formed in the absence of a second solvent. As can be seen from the SEM images, both membranes are porous, and neither membrane has a substantially non-porous surface layer.

The first non-solvent serves as a coagulation, or phase inversion, bath for the membrane-forming composition. The membrane is formed by contacting the membrane-forming composition with the first non-solvent. The poly(phenylene ether) copolymer, which is near its gel point in the membrane-forming composition, coagulates, or precipitates as a film or hollow fiber. The second non-solvent serves to optionally rinse residual first and second solvent, and hydrophilic polymer, if present, from the membrane. The first and second non-solvents are the same or different, and comprise water, or a mixture of water and a water-miscible polar aprotic solvent. The water-miscible polar aprotic solvent can be the same as the first solvent of the membrane-forming composition. In some embodiments the first and second non-solvents are independently selected from water, and a water/N-methylpyrrolidone mixture. In some embodiments, the first and second non-solvents are both water. The water can be deionized.

In some embodiments, the first non-solvent comprises 10 to 100 weight percent water and 0 to 90 weight percent N-methyl-2-pyrrolidone, based on the total weight of the first non-solvent composition. Within this range, the first non-solvent composition can comprise 40 to 100 weight percent, specifically 40 to 80 weight percent, water and 0 to 60 weight percent, specifically 20 to 60 weight percent, N-methyl-2-pyrrolidone. In some embodiments, the first non-solvent composition comprises about 70 weight percent water and about 30 weight percent N-methyl-2-pyrrolidone.

The asymmetric membranes can further comprise an additional hydrophobic polymer, in particular a poly(phenylene ether) homopolymer, polyethersulfone, polysulfone, polyphenylsulfone, or a combination comprising at least one of the foregoing. An example of a poly(phenylene ether) homopolymer that can be used is PPO™ 6130, available from SABIC Innovative Plastics. Examples of polyethersulfone, polysulfone, and polyphenylsulfone that can be used are ULTRASON™ E, ULTRASON™ S, and ULTRASON™ P, respectively, available from BASF Plastics. The additional hydrophobic polymer can be present in an amount of 1 to 50 weight percent, specifically 2 to 25 weight percent, based on the total weight of the membrane.

In some embodiments, a hydrophilic polymer is not present. The absent hydrophilic polymer can be, for example, polyacrylamide, poly(N,N-dimethyl acrylamide), poly(vinyl alcohol), a poly(vinyl ether), a poly(vinyl ester), such as poly(vinyl acetate) or poly(vinyl propionate), a poly(vinyl aldehyde), such as poly(vinyl formal) or poly (vinyl butyral), a poly(vinyl amine), such as poly(vinyl pyridine), poly(vinyl pyrrolidone), poly(vinyl imidazole), poly(4-acryloylmorpholine), poly(oxazoline), poly(ethyleneamine), poly(ethylene glycol), poly(propylene glycol), a poly(ethylene glycol) monoether, a block copolymer of poly(ethylene glycol) and poly(propylene glycol), poly (alkoxy-capped poly(ethylene glycol) methacrylate), or a combination comprising at least one of the foregoing.

Preferably, the absent hydrophilic polymer is poly(vinyl pyrrolidone), poly(oxazoline), poly(ethylene glycol), poly (propylene glycol), a poly(ethylene glycol) monoether or monoester, a poly(propylene glycol) monoether or monoester, a block copolymer of poly(ethylene glycol) and poly(propylene glycol), or a combination comprising at least one of the foregoing. In some embodiments, the absent hydrophilic copolymer is poly(vinyl pyrrolidone). Hydrophilic copolymers can be used in membrane-forming compositions to impart a viscosity to the membrane-forming composition that is conducive to the formation of an asymmetric membrane having a substantially non-porous surface layer that is selectively semi-permeable to gases. Advantageously, asymmetric membranes having a substantially non-porous surface layer that is selectively semi-permeable to gases are obtained in the absence of hydrophilic copolymers or any other viscosity modifier when the membrane is formed from the poly(phenylene ether) copolymer described above.

Any of several techniques for the phase-inversion step of membrane formation can be used. For example, the phase-inversion step can be a dry-phase separation method in which the dissolved poly(phenylene ether) copolymer is precipitated by evaporation of a sufficient amount of solvent mixture to form the membrane. The phase-inversion step can also be a wet-phase separation method in which the dissolved poly(phenylene ether) copolymer is precipitated by immersion in the first non-solvent to form the membrane. The phase-inversion step can be a dry-wet phase separation method, which is a combination of the dry-phase and the wet-phase methods. The phase-inversion step can be a thermally-induced separation method in which the dissolved poly(phenylene ether) copolymer is precipitated or coagulated by controlled cooling to form the membrane. The membrane, once formed, can be subjected to membrane conditioning or pretreatment, prior to its end-use. The conditioning or pretreatment can be thermal annealing to relieve stresses or pre-equilibration in a gas mixture similar to the gas feed in the end-use application. The description of the asymmetric membrane above is also applicable to the method of forming the asymmetric membrane. For example in the method, the first monohydric phenol can comprise 2-methyl-6-phenylphenol.

The asymmetric membranes having a substantially non-porous surface layer can be used to make gas separation modules. Thus, a gas separation module comprises an asymmetric membrane having a non-porous surface layer, and is made by a method comprising: dissolving a poly(phenylene ether) copolymer in a solvent mixture comprising a first solvent and a second solvent to make a membrane-forming composition, wherein the poly(phenylene ether) copolymer comprises 80 to 20 mole percent of repeat units derived from 2,6-dimethylphenol; and 20 to 80 mole percent of repeat units derived from a first monohydric phenol having the structure

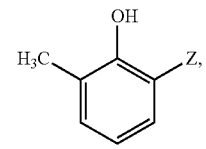

wherein Z is $C_1$-$C_{12}$ alkyl or cycloalkyl, or a monovalent radical having the structure

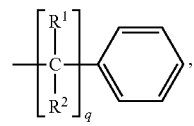

wherein q is 0 or 1, and $R^1$ and $R^2$ are independently hydrogen or $C_1$-$C_6$ alkyl; wherein the poly(phenylene ether) copolymer has an intrinsic viscosity of 0.7 to 1.5 deciliters per gram, measured in chloroform at 25° C.; and wherein the first solvent is a water-miscible polar aprotic solvent, and the second solvent is water, a polar solvent having two to eight carbon atoms, or a combination comprising at least one of the foregoing; phase-inverting the membrane forming composition in a first non-solvent to form the membrane; optionally washing the membrane in a second non-solvent; and drying the membrane. The membrane has a substantially non-porous surface layer.

The asymmetric membrane is effective for gas separation below the glass transition temperature of the poly(phenylene ether) copolymer. Without being bound by theory, gas separation can occur by a solution/diffusion mechanism. Small gas molecules can dissolve in the poly(phenylene ether) copolymer above its glass transition temperature, and thereby diffuse through the surface layer. Diffusion rates depend on the specific poly(phenylene ether) copolymer and copolymer morphology, the specific gas, size of the gas molecule, and temperature. Different gases can be separated due to their different diffusion rates through the asymmetric membrane.

In some embodiments, the membrane is an asymmetric hollow fiber. The diameter of the hollow fiber can be 30 to 100 nanometers. Within this range, the diameter can be less than or equal to 80, 60, 40, or 35 nanometers. In some embodiments, the substantially non-porous surface layer can be on the outside of the hollow fiber. A hollow fiber module can comprise bundles of asymmetric hollow fibers. The fiber bundle can comprise 10 to 10,000 asymmetric hollow fibers. The asymmetric hollow fibers can be bundled longitudinally, potted in a curable resin on both ends, and encased in a pressure vessel. Hollow fiber modules can be mounted vertically or horizontally.

Flux across the membrane is driven by the pressure differential across the membrane. The pressure differential can be provided by a blower or a compressor, for example. The pressure differential across the membrane can be 1 kilopascal (kPa) to 500 kPa, specifically 2 kPa to 300 kPa, more specifically 4 kPa to 50 kPa.

Figure 4:
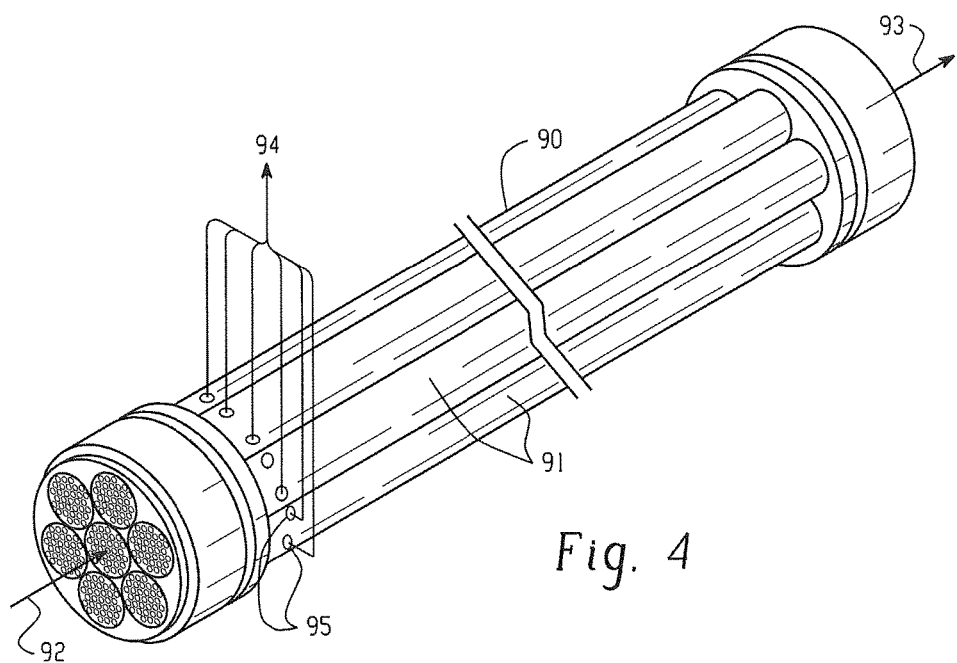
FIG. 4 shows an embodiment of a hollow fiber gas separation module.

Disclosed in FIG. 4 is an embodiment of a hollow fiber gas separation module 90 comprising one or more bundles of hollow fibers of the asymmetric membrane. Each fiber bundle may be contained within an enclosure 91 that is substantially impermeable to the gases to be separated to prevent gas from passing between adjacent fiber bundles. The hollow fibers may be embedded in and communicate through an encasement 96 at either end of the module. The encasement may comprise a thermoset, such as epoxy, polyester, melamine, polysiloxane, or a polyurethane; or may comprise a thermoplastic, such as polyethylene, polypropylene, poly(ethylene terephthalate), poly(1,4-butylene terephthalate), for example. The feed stream 92 enters the bore of the fibers at one end of the module and the retentate stream 93 leaves at the opposite end. The encasement may be disposed at ends of the bundles for attaching and sealing to the bundles. The permeate 94 can be recovered from holes 95 disposed in a side of the enclosure, alternatively the permeate may be recovered from holes in the encasement.

Figure 5:
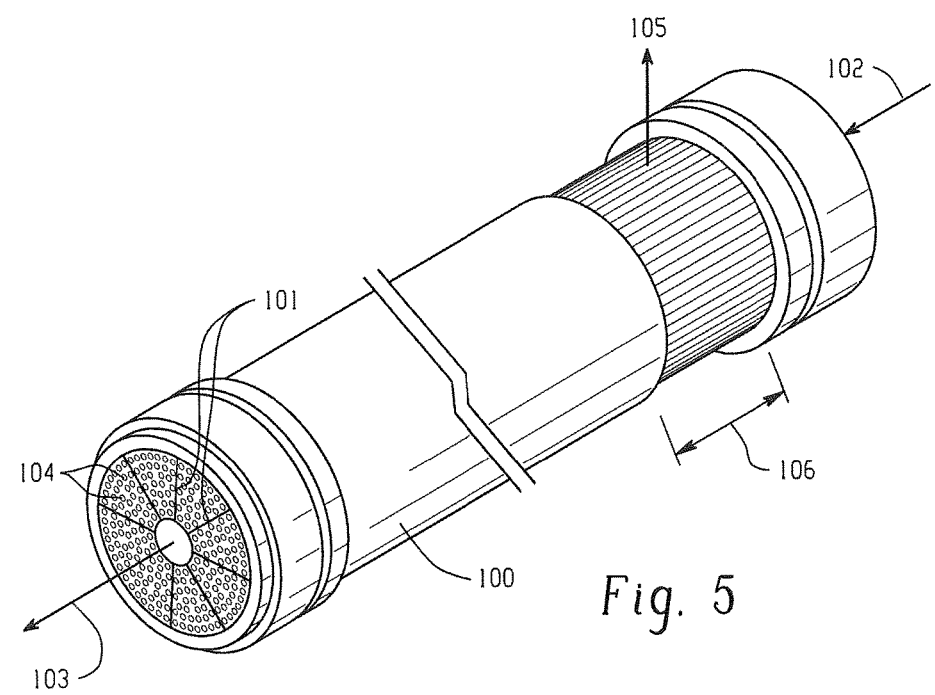
FIG. 5 shows another embodiment of a gas separation module.

The fiber bundles need not be cylindrical. For example, shown in FIG. 5 is an embodiment of a gas separation module 100 in which the bundles of fibers are separated by an impermeable barrier 101. In the gas separation module 100, the feed stream 102 enters the bores of the hollow fibers at one end of the bundles 104 and the retentate stream 103 exits at the opposite end. The permeate fluid 105 can exit the module through an opening 106 in a side of the module.

Figure 6:
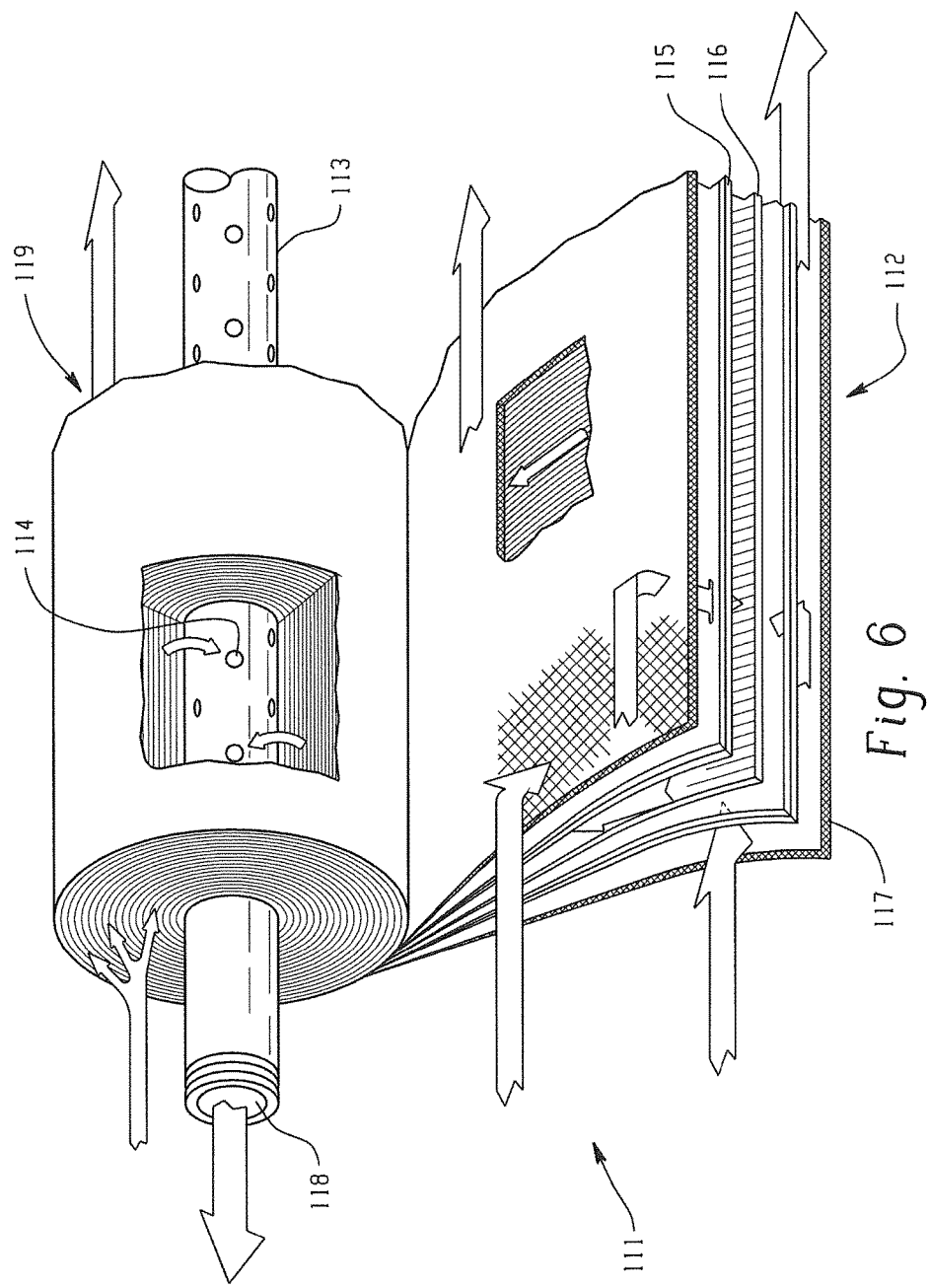
FIG. 6 shows an embodiment of a spiral wound gas separation module.

The gas separation module may have a spiral wound design, as shown in FIG. 6. A spiral wound gas separation module 111 may comprise a sheet of the asymmetric membrane 112 wound onto a hollow core member 113 having perforations 114. Alternatively, the hollow core member 113 may comprise a porous material. Additional layers, such as reinforcing layer 115, inner spacer 116, and outer spacer 117 are optionally provided. The permeated gas passes through the perforations 114 in the hollow core member 113 and can be removed through the output 118 of the hollow core member 113. Retentate gas passes through the outer spacer 117 and exits through the residual output 119.

Figure 7:
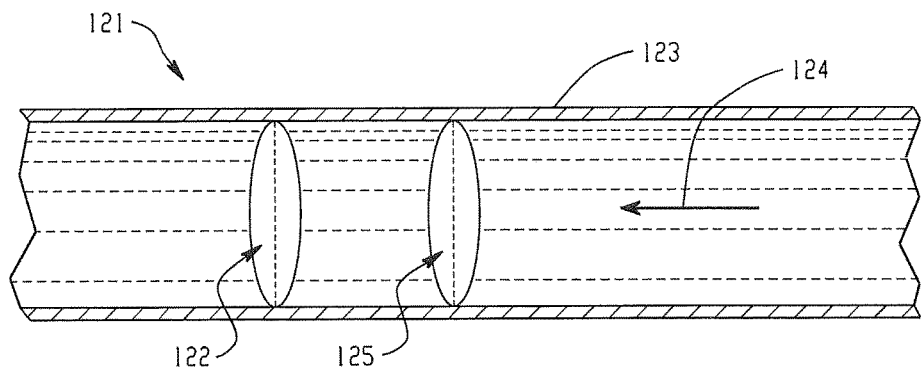
FIG. 7 shows an embodiment of a disk gas separation module.

The gas separation module may have a disk design, as shown in FIG. 7. A disk gas separation module 121 may comprise a filter 122 comprising the asymmetric membrane disposed within a tube 123. The tube may comprise any suitable material, such as a material that is impermeable to the fluid. A support (not shown) may be optionally present. The fluid 124 may contact the disk at a selected pressure sufficient to cause the permeate to pass through the disk. In another embodiment, a plurality of disks may be used, for example to provide a prefilter 125. The prefilter 125 may be the same as or different than the filter 122. For example, the prefilter 125 may have larger pores than the filter 122, or the prefilter 125 may further comprise a functionalized surface, e.g., a surface having a catalyst disposed thereon. In another embodiment the prefilter 125 comprises the asymmetric membrane and the filter 12 comprises a different material.

Figure 8:
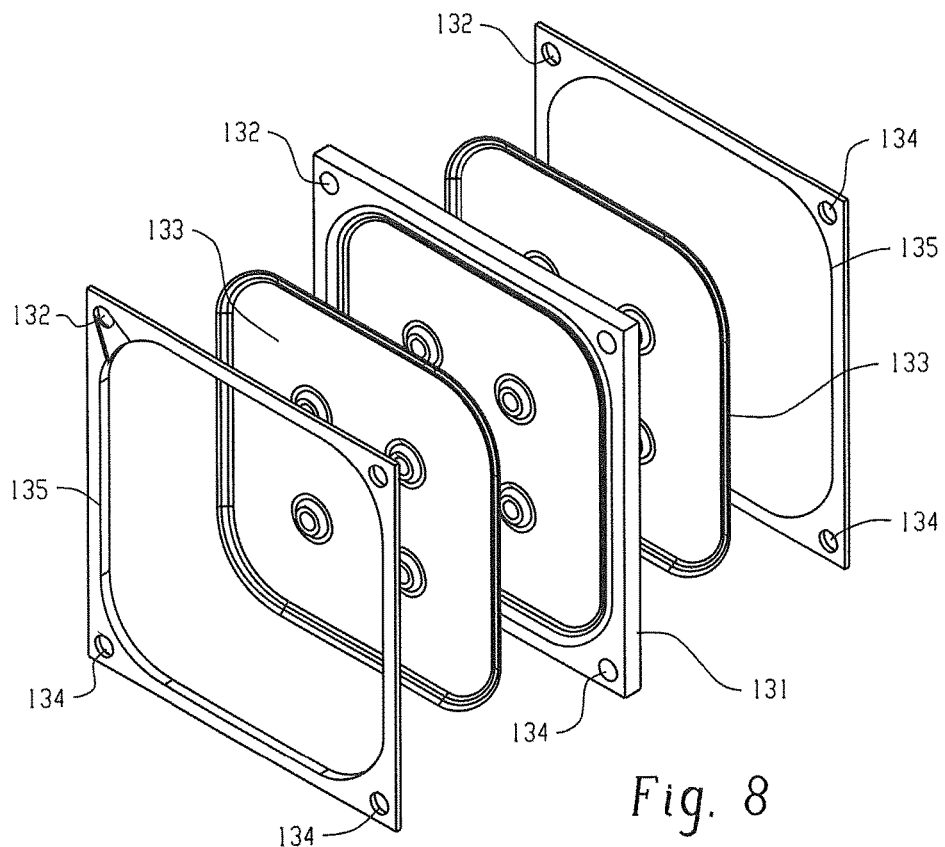
FIG. 8 shows an embodiment of a plate and frame gas separation module.

The gas separation module may have a plate and frame design, as shown in the expanded view of FIG. 8. A filter plate of the gas separation module may comprise a base body 131, the asymmetric membrane 133, and a frame 135, wherein the frame 135 comprises an inlet 132 and an outlet 134. The asymmetric membrane is mounted on one or both sides of the base body and is held in place by a frame mounted in face to face contact with the asymmetric membrane to form the filter plate. The filter can have any suitable shape, and can be square, round, rectangular, or polygonal. The inlet and outlet allow entry of the input stream and exit of the permeate stream. An advantage of the plate and frame design is that the filter media used in making the filter plate assembly can be replaced when desired. The frame 135 and base body may comprise any suitable material, such as a metal, such as steel, or aluminum, or a polymer such as polypropylene or polyethylene. The frame 135 may be fabricated by a molding or a casting process and then machined to the desired size. Due to the solid nature of the frame 135, it can hold the asymmetric membrane 133 to the base body 131 tightly and provide a desirable sealing effect.

The module is useful for many different gas separation applications, including, but not limited to, providing of an enriched nitrogen stream for inerting of flammable fluids, perishable foodstuffs, and metal treating processes, providing an enriched oxygen stream for medical or industrial uses, fermentation processes, enhanced combustion processes, recovering carbon dioxide from light hydrocarbons, treating flue gases to remove nitrogen oxides and/or sulfur oxides, removing organic vapors from air, dehydrating air and natural gas, and the like. In addition, the module is useful for separating gases and/or vapors from mixtures of liquids or mixtures of liquids and gases using the membrane separation processes of membrane stripping or membrane distillation. In membrane stripping, a material permeating through or across the membrane is removed from the module as a gas or a vapor. In membrane distillation, a membrane is used and the material permeating through or across the membrane is condensed and removed from the device as a liquid.

The feed stream may be a gas mixture, e.g., a mixture of hydrogen, helium, oxygen, nitrogen, carbon monoxide, carbon dioxide, hydrogen sulfide, ammonia, water vapor, a nitrogen oxide, a sulfur oxide, a C1-C8 hydrocarbon, natural gas, an organic vapor, a fluorocarbon, or a refrigerant gas, for example. The permeate stream may be an oxygen-enriched gas or a nitrogen-enriched gas, for example.

The module may be operated in any suitable configuration or combination, including but not limited to, parallel, series, recycle, or cascade operation. The module may be operated in conjunction with other separation processes or unit operations including but not limited to, crystallization, fractionation, filtration, reactions, heat exchange, compression, expansion, pumping, and swing adsorption.

A gas enrichment system may comprise the module. The gas enrichment module and system may be used to enrich or deplete a feed gas, e.g. to enrich or deplete air, natural gas, digester gas, or flue gas with oxygen, carbon dioxide, nitrogen, hydrogen, hydrogen sulfide, or a combination thereof.

For example, in an embodiment disclosed is a gas enrichment module and a gas enrichment system to provide a nitrogen-enriched gas. Nitrogen-enriched gases are desirable for inerting systems, for example for inerting fuel tanks. Alternatively, a nitrogen-depleted gas may be provided.

The invention includes at least the following embodiments.

Embodiment 1

An asymmetric membrane having a substantially non-porous surface layer made by a method comprising: dissolving a poly(phenylene ether) copolymer having an intrinsic viscosity of 0.7 to 1.5 deciliters per gram, measured in chloroform at 25° C., in a solvent mixture comprising a first solvent and a second solvent to provide a membrane-forming composition; phase-inverting the membrane forming composition in a first non-solvent to form the membrane comprising a substantially non-porous surface layer; wherein the first solvent is a water-miscible polar aprotic solvent, and the second solvent is a polar solvent having two to eight carbon atoms.

Embodiment 2

The asymmetric membrane of embodiment 1, wherein the method further comprises washing the membrane in a second non-solvent and drying the membrane.

Embodiment 3

The asymmetric membrane of embodiment 1 or 2, wherein the poly(phenylene ether) copolymer comprises first and second repeat units having the structure:

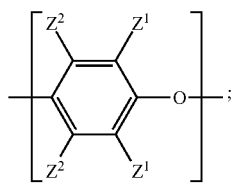

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein at least two carbon atoms separate the halogen and oxygen atoms; wherein each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein at least two carbon atoms separate the halogen and oxygen atoms; and wherein the first and second repeat units are different.

Embodiment 4

The asymmetric membrane of any of embodiments 1-3, wherein the poly(phenylene ether) copolymer comprises, consists essentially of, or consists of: 80 to 20 mole percent repeat units derived from 2,6-dimethylphenol; and 20 to 80 mole percent repeat units derived from a first monohydric phenol having the structure

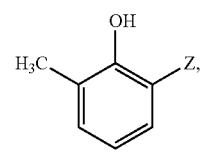

wherein Z is $C_1$-$C_{12}$ alkyl or cycloalkyl, or a monovalent radical having the structure

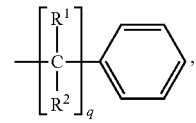

wherein q is 0 or 1, and $R^1$ and $R^2$ are independently hydrogen or $C_1$-$C_6$ alkyl; wherein the poly(phenylene ether) copolymer has an intrinsic viscosity of 0.7 to 1.5 deciliters per gram, measured in chloroform at 25° C.

Embodiment 5

The asymmetric membrane of any of embodiments 1-4, in which a hydrophilic polymer is not present.

Embodiment 6

The asymmetric membrane of embodiment 5, wherein the hydrophilic polymer is poly(vinyl pyrrolidone), poly(oxazoline), poly(ethylene glycol), poly(propylene glycol), a poly(ethylene glycol) monoether or monoester, a poly(propylene glycol) monoether or monoester, a block copolymer of poly(ethylene glycol) and poly(propylene glycol), or a combination comprising at least one of the foregoing.

Embodiment 7

The asymmetric membrane of embodiment 4, wherein the first monohydric phenol is 2-methyl-6-phenylphenol.

Embodiment 8

The asymmetric membrane of any of embodiments 1-7, wherein the solubility of the poly(phenylene ether) copolymer in the water-miscible polar aprotic solvent is 50 to 400 grams per kilogram at 25° C., based on the combined weight of the poly(phenylene ether) copolymer and the solvent.

Embodiment 9

The asymmetric membrane of any of embodiments 1-8, further comprising a poly(phenylene ether) homopolymer, polyethersulfone, polysulfone, polyphenylsulfone, or a combination comprising at least one of the foregoing.

Embodiment 10

A gas separation module comprising the asymmetric membrane of any of embodiments 1-9.

Embodiment 11

The gas separation module of embodiment 10, wherein the asymmetric membrane comprises an asymmetric hollow fiber.

Embodiment 12

The gas separation module of embodiment 11, comprising a bundle of 10 to 10,000 of the asymmetric hollow fibers.

Embodiment 13

The gas separation module of embodiment 12, comprising a plurality of the bundles.

Embodiment 14

The gas separation module of embodiment 12, wherein the gas separation module comprises: an enclosure configured to contain the bundle, the enclosure having an outlet adapted for withdrawing a permeate fluid; a first encasement comprising a thermoset or a thermoplastic polymeric material and located at a first end of the bundle, arranged such that the hollow fiber membranes are embedded in the first encasement and communicate through the first encasement and are open on an outer face of the first encasement; a second encasement comprising a thermoset or a thermoplastic polymeric material and located at a second end of the bundle opposite the first end of the bundle, arranged such that the hollow fiber membranes are embedded in the second encasement and communicate through the second encasement and are open on an outer face of the second encasement; a first end cap arranged and adapted for attaching and sealing to the first end of the bundle or enclosures at or near the first encasement; a second end cap arranged and adapted for attaching and sealing to the second end of the bundle or enclosures at or near the second encasement; an inlet for introducing a fluid mixture to be separated into bores of the hollow fiber membranes at the first encasement; and an outlet for withdrawing a retentate fluid from the bores for the hollow fiber membranes at the second encasement.

Embodiment 15

The gas separation module of embodiment 10, wherein the asymmetric membrane is a form of a sheet.

Embodiment 16

The gas separation module of embodiment 10, wherein the asymmetric membrane is in a form of a spiral.

Embodiment 17

The gas separation module of embodiment 15, wherein gas separation module comprises: a hollow core comprising perforations; the asymmetric membrane wound around the core; and a spacer disposed adjacent the asymmetric membrane.

Embodiment 18

A method of forming an asymmetric membrane having a non-porous surface layer comprising: dissolving a poly (phenylene ether) copolymer having an intrinsic viscosity of 0.7 to 1.5 deciliters per gram, measured in chloroform at 25° C. in a solvent mixture comprising a first solvent and a second solvent to make a membrane-forming composition, wherein the first solvent is a water-miscible polar aprotic solvent, and the second solvent is a polar solvent having two to eight carbon atoms; and phase inverting the membrane-forming composition in a first non-solvent to form the membrane.

Embodiment 19

The method of embodiment 18, further comprising washing the asymmetric membrane in a second non-solvent.

Embodiment 20

The method of embodiment 18 or 19, further comprising drying the asymmetric membrane.

Embodiment 21

The method of any of embodiments 18-20, wherein a hydrophilic polymer is not present in the membrane-forming composition.

Embodiment 23

The method of embodiment 21, wherein the hydrophilic polymer is polyvinylpyrrolidone, polyoxazoline, polyethylene glycol, polypropylene glycol, polyglycol monoester, copolymers of polyethylene glycol with polypropylene glycol, a water-soluble cellulose derivative, polysorbate, polyethylene-polypropylene oxide copolymers, polyethyleneimine, or a combination comprising at least one of the foregoing.

Embodiment 24

The method of any of embodiments 18-23, wherein the first monohydric phenol comprises 2-methyl-6-phenylphenol.

Embodiment 25

The method of any of embodiments 18-24, wherein the membrane further comprises a polymer selected from poly (phenylene ether) homopolymer, polyethersulfone, polysulfone, polyphenylsulfone, or a combination comprising at least one of the foregoing.

Embodiment 26

The method of any of embodiments 18-25, wherein the membrane is a hollow fiber membrane, and the method further comprises extruding the membrane forming composition through an outer concentric ring of an annular die into the first non-solvent while simultaneously pumping the first non-solvent through an inner concentric bore of the annular die.

Embodiment 27

The method of any of embodiments 18-26, wherein the membrane is an asymmetric flat membrane, and the method further comprises continuous casting of a sheet or film of the membrane forming composition onto a substrate.

Embodiment 28

The gas separation module of any of embodiments 10-17, wherein the module is configured for dead-end separation, cross-flow separation, inside-out separation, or outside-in separation.

Embodiment 29

The gas separation module of any of embodiments 10-17 or 28, wherein a configuration of the membrane is selected from a sheet, disc, spiral wound, plate and frame, hollow fiber, capillary, or tube.

Embodiment 30

A membrane-forming composition comprising: a poly (phenylene ether) copolymer having an intrinsic viscosity of 0.7 to 1.5 deciliters per gram, measured in chloroform at 25° C.; and a solvent mixture comprising a first solvent and a second solvent, wherein the first solvent is a water-miscible polar aprotic solvent, and the second solvent is a polar solvent having two to eight carbon atoms; wherein the poly(phenylene ether) copolymer is dissolved in the solvent mixture.

Embodiment 31

A method of gas separation, the method comprising: contacting a first surface of the asymmetric membrane of any of embodiments 1-9 with a feed stream; and collecting at least one of a retentate stream and a permeate stream to separate the gas.

Embodiment 32

A method of gas separation, the method comprising: passing a feed stream into the gas separation module of any of embodiments 1-9; and collecting at least one of a retentate stream and a permeate stream from the gas separation module to separate the gas.

Embodiment 33

The method of embodiment 31 or 32, wherein the method comprises countercurrent flow distribution.

Embodiment 34

The method of any of embodiments 31-33, wherein the feed stream comprises air, flue gas, digester gas, fermentation gas, sewage gas, natural gas, coal gas, synthesis gas, or combination thereof.

Embodiment 35

The method of any of embodiments 31-34, wherein the feed stream comprises hydrogen, carbon dioxide, carbon monoxide, sulfur dioxide, helium, hydrogen sulfide, nitrogen, oxygen, argon, hydrogen sulfide, nitronic oxide, nitrous oxide, nitric oxide, ammonia, a hydrocarbon of one to five carbon atoms, hydrogen chloride, or a combination thereof.

Embodiment 36

The method of any of embodiments 31-34, wherein the feed stream comprises air, air and methane, air and carbon dioxide, air and carbon monoxide, methane and carbon dioxide, methane and $H_2S$, methane and carbon monoxide, hydrogen and carbon monoxide, or combination thereof.

Embodiment 37

The method of any of embodiments 31-34, wherein at least one of the retentate stream and the permeate stream comprises nitrogen-enriched air, oxygen-enriched air, carbon dioxide-enriched air, nitrogen-depleted air, oxygen-depleted air, carbon dioxide-depleted air, hydrogen sulfide-depleted methane, hydrogen-enriched syngas, or combination thereof.

Embodiment 38

A system for providing oxygen enriched air, the system comprising: the gas separation module of any of embodiments 10-17 and 28-29; a means to provide a feed stream to an inlet of the gas separation module; and a means to recover at least one of a retentate stream and a permeate stream from the gas separation module and provide oxygen enriched air.

Embodiment 39

The system of embodiment 38, wherein the means to provide a feed stream to an inlet of the gas separation module comprises a compressor, which directs air to the gas separation module, and wherein the means to recover at least one of the retentate stream and the permeate stream from the gas separation module is adapted for delivery of the oxygen enriched air to a person desiring oxygen enriched air.

Embodiment 40

The system of embodiment 38 or 39, further comprising a filter, a vaporizer, a safety vent, a flow indicator, or combination thereof.

Embodiment 41

The system of any of embodiments 38-40, wherein the means to provide a feed stream to an inlet of the gas separation module and the means to recover at least one of the retentate stream and the permeate stream from the gas separation module comprises: a low energy fan in fluid communication with the gas separation module configured to draw in and then blow normal atmospheric air across the outsides of the membranes, two evacuation chambers inside the gas separation module configured to apply a vacuum equally to each end of the hollow cores inside the membranes, a vacuum pump to supply the vacuum to the gas separation module, an oxygen sensor to measure the oxygen concentration in the enriched oxygen air produced by the gas separation module, and a regulating valve to adjust the concentration of oxygen in the oxygen enriched air, by admitting normal atmospheric air into the oxygen-rich air.

Embodiment 42

A multi-unit system for supplying enriched oxygen air, comprising two or more of the systems of any of embodiments 38-40 connected in parallel, the modules comprising hollow fiber membranes.

Embodiment 43

A system for generating oxygen enriched air, the system comprising the gas separation module of any of embodiments 10-17 or 28-29.

Embodiment 44

The system of embodiment 43, further comprising a compressor, a surge tank, a vaporizer, or a combination thereof.

Embodiment 45

A system for treating flue gas comprising the gas separation module of any of embodiments 10-17 and 28-29.

Embodiment 46

A system for capturing $CO_2$ from a flue gas, the system comprising: the gas separation module of any of embodiments 10-17 or 28-29; a means to provide a flue gas to an inlet of the gas separation module; and a means to recover at least one of a retentate stream and a permeate stream from the gas separation module to capture $CO_2$ from the flue gas.

Embodiment 47

The system of embodiment 46, further comprising: a means for recirculating a portion of the flue gas to an inlet of generator which generates the flue gas; a means for capturing the $CO_2$; and optionally a means for recirculation of a $CO_2$ depleted flue gas into the flue gas.

Embodiment 48

The system of embodiment 46 or 47, wherein the flue gas is a product of combustion of a hydrocarbon.

Embodiment 49

The system of embodiment 47, wherein the generator is a gas turbine.

Embodiment 50

A system for desulfurizing a gas, the system comprising: the gas separation module of any of embodiments 10-17 or 28-29; a means to provide a feed gas comprising a sulfurous gas to an inlet of the gas separation module; and a means to recover at least one of a retentate stream and a permeate stream from the gas separation module to provide a desulfurized gas.

Embodiment 51

The system of embodiment 50, wherein the feed gas is natural gas and wherein the sulfurous gas is hydrogen sulfide, carbon monoxide, carbon dioxide, or a combination thereof.

Embodiment 52

A system for controlling the dew point of a gas which is dehumidified for introduction into a dry gas system, the system comprising: a gas separation module of any of embodiments 10-17 or 28-29, the gas separation module having an inlet for receiving the gas to be dehumidified, a first outlet for ejecting dehumidified gas from the gas separation module, and a second outlet for ejecting water vapor from the gas separation module; a means for introducing the gas to be dehumidified into the inlet of the gas separation module; and a means for controlling the dew point of the dehumidified gas ejected from the gas separation module by regulating the flow rate at which the gas is passed through the gas separation module in accordance with a predetermined relationship between the dew point and the flow rate for the gas separation module.

Embodiment 53

A system for controlling a dew point of a gas, the system comprising a gas separation module of any of embodiments 7-10 or 28-29, the gas separation module comprising: a first inlet for directing a feed gas into bores of the hollow fiber membranes, an outlet for recovery of a dew point controlled gas from bores of the hollow fiber membranes, and a second inlet for directing a humidified gas to an outer surface of the hollow fiber membranes.

Embodiment 54

The system of embodiment 53, further comprising a means for providing a pressure differential across the hollow fiber membranes to cause water from the humidified gas to pass through the hollow fiber membranes and humidify the feed gas to provide the dew point controlled gas.

Embodiment 55

A system for humidifying a gas, the system comprising a gas separation module of any of embodiments 10-17 or 28-29, the gas separation module comprising: a means for directing a humidified gas into bores of the hollow fiber membranes; a means for contacting an outer surface of the hollow fiber membranes with a feed gas to provide a dew point controlled gas.

Embodiment 56

The system of embodiment 55, further comprising a means for providing a pressure differential across the hollow fiber membranes to cause water from the humidified gas to pass through the hollow fiber membranes and humidify the feed gas to provide the dew point controlled gas.

The invention is further illustrated by the following non-limiting examples.

PREPARATIVE EXAMPLES: SYNTHESIS OF MPP-DMP COPOLYMERS

The copolymerizations were conducted in a bubbling polymerization reactor equipped with a stirrer, temperature control system, nitrogen padding, oxygen bubbling tube, and computerized control system. There were also feeding pot and pump for dosing reactants into the reactor.

TABLE 1

Materials

| Abbreviation | Chemical Name |
|---|---|
| DMP | 2,6-Dimethylphenol |
| MPP | 2-Methyl-6-phenylphenol |
| DBA | Di-n-butylamine |
| DBEDA | N,N'-Di-tert-butylethylenediamine |
| DMBA | N,N-Dimethylbutylamine |
| QUAT | Didecyldimethyl ammonium chloride |
| NTA | Nitrilotriacetic acid |
| CAT | Solution of $Cu_2O$ in concentrated HBr, 6.5 wt. % Cu |
| NMP | N-Methyl-2-pyrrolidone, available from ThermoFisher. |
| 6020P | Polyethersulfone (PES), available from BASF as ULTRASON ™ E 6020P. |
| PES | Polyethersulfone. |
| PVP K30 | Poly(vinyl pyrrolidone) having a K value of 26-35, calculated for a 1% aq. solution by the Finkentscher equation; and available from Aldrich. |
| PVP K90 | Poly(vinyl pyrrolidone) having a K value of 90-100, calculated for a 1% aq. solution by the Finkentscher equation; and available from Aldrich. |

Preparative Example 1: Preparation of MPP-DMP Copolymer with 50 Mole Percent MPP in 1.8-Liter Reactor Toluene (622.88 grams), DBA (8.1097 grams), DMBA (30.71 grams), and 5.44 grams of a diamine mix consisting of 30 weight percent (wt. %) DBEDA, 7.5 weight percent QUAT, and the balance toluene, were charged to a bubbling polymerization reactor and stirred under a nitrogen atmosphere at 25° C. A mix of 6.27 grams HBr and 0.5215 grams $Cu_2O$ was added. Oxygen flow to the vessel was begun after 4 minutes of monomer mixture addition. The reactor temperature was ramped to 40° C. in 18 min, maintained at 40° C. for 57 min, ramped to 45 C in 11 min, maintained at 45° C. for 33 min and ramped to 60° C. in 10 min. 403.67 grams of monomer solution (20.3 wt. % DMP, 30.6 wt. % MPP and 49. 1 wt. % toluene) was added over 35 minutes. Oxygen flow was maintained for 115 minutes, at which point the oxygen flow was stopped and the reaction mixture was immediately transferred to a vessel containing 11.07 grams NTA salt and 17.65 grams DI (deionized) water. The resulting mixture was stirred at 60° C. for 2 hours, and the layers were then allowed to separate. The decanted light phase was precipitated in methanol, filtered, reslurried in methanol, and filtered again. The copolymer was obtained as a dry powder after drying in a vacuum oven under nitrogen blanket at 110° C.

Preparative Examples 2-4: Preparation of MPP-DMP Copolymers with 20, 50, and 80 Mole % MPP with Intrinsic Viscosities of ~1 Deciliter Per Gram The process of Preparative Example 1 was scaled to a one gallon steel bubbling reactor and copolymerization was conducted in similar fashion as described above. The ingredients for the batch reactor charges and continuous monomer feed solution are shown in Table 2. After charging the reactor the contents were brought with stirring to 25° C. before starting the continuous feed of monomer in toluene and then oxygen feed. The monomer/toluene mixture was fed over 45 minutes, and oxygen feed was maintained until 130 minutes. The reactor temperature was ramped to 45° C. at 90 minutes and then ramped to 60° C. at 130 minutes. The reaction contents were then transferred to a separate vessel for addition of NTA to chelate the copper, followed by separation of the toluene solution from the aqueous phase in centrifuge, precipitation of the copolymer solution into methanol as described above.

TABLE 2

Material Amounts for Preparative Examples 2-4

| Raw Material (g) | Example 2 | Example 3 | Example 4 |
|---|---|---|---|
| MPP/DMP (mole ratio) | 20/80 | 50/50 | 80/20 |
| CAT | 17.3 | 21.6 | 17.3 |
| DBEDA | 5.3 | 6.7 | 5.3 |
| DBA | 9.9 | 9.9 | 9.9 |
| DMBA | 34.3 | 33.3 | 32.5 |
| QUAT | 1.6 | 2.0 | 1.6 |
| DMP/TOLUENE 50/50 | 29.5 | 18.5 | 5.5 |
| TOLUENE | 2961.0 | 2961.0 | 2961.0 |
| MPP | 5.6 | 14.0 | 16.0 |
| Continuous Feed Solution | | | |
| DMP/TOLUENE 50/50 | 364.5 | 228 | 64 |
| MPP | 69.4 | 172 | 197 |
| Total | 3498.36 | 3466.925 | 3310.08 |

The dried copolymers were characterized for molecular weight distribution via gel permeation chromatography (GPC) using $CHCl_3$ as solvent and referenced to polystyrene standards. Intrinsic viscosity (IV) was measured in $CHCl_3$ solution at 25° C. using an Ubbelohde viscometer, and is expressed in units of deciliters per gram (dL/g). The glass transition temperature Tg was measured using differential scanning calorimetry (DSC) and expressed in ° C. The results for examples 1-4 are summarized in Table 3. "Mn" refers to number average molecular weight, "Mw" refers to weight average molecular weight, "D" refers to polydispersity, and "g" refers to grams.

TABLE 3

Characterization of MPP-DMP Copolymers of Preparative Examples 1-4

| Ex. No. | Scale | MPP/DMP (mole/mole) | GPC Mn (g/mole) | GPC Mw (g/mole) | GPC D (Mw/Mn) | IV in $CHCl_3$ (dL/g) | Tg ° C. |
|---|---|---|---|---|---|---|---|
| PE 1 | 1.8 liter | 50/50 | 20,213 | 219,130 | 10.8 | 0.83 | 185 |
| PE 2 | 1 gallon | 20/80 | 50,310 | 172,100 | 3.4 | 1.04 | 210 |
| PE 3 | 1 gallon | 50/50 | 39,820 | 194,900 | 4.9 | 0.97 | 187 |
| PE 4 | 1 gallon | 80/20 | 22,620 | 241,000 | 10.7 | 0.96 | 177 |

General Laboratory Procedure for Casting Asymmetric Membranes

Asymmetric membranes having a substantially non-porous surface layer (or skinned asymmetric membranes) were cast in the laboratory by dissolving the polymers in NMP at a concentration of about 16 wt % to form a viscous casting solution; pouring the casting solution onto a glass plate; and drawing a thin film about 150-250 micrometers thick, across the plate by means of a casting knife. The glass plate bearing the thin film of casting solution was immersed in a primary coagulation bath, consisting of a mixture of NMP and water. The polymers precipitated and coagulated within 10-15 minutes. The coagulated polymer films floated free of the glass plate when coagulation was substantially complete. The polymer films were transferred to a second bath of water, and rinsed with water to remove residual NMP. Asymmetric flat sheet and hollow fiber membranes were formed by continuous phase-inversion casting or hollow fiber spinning processes. The concentration of polymer in the casting solution was increased to provide a suitable viscosity, preferably at a concentration close to the gel point of the solution, when necessary.

Comparative Examples 1 and 2: Porous Asymmetric Membranes Cast from 50/50 MPP-DMP Copolymer and from PES/PVP A sample of polyethersulfone (PES, ULTRASON™ E 6020 P) having a high molecular weight, and of a grade typically used to cast hollow fiber membranes for hemodialysis was dissolved in NMP at 16 wt. % in combination with 8 wt. % of polyvinylpyrrolidone (PVP K30). In Comparative Example 1, this solution was cast into a membrane in the laboratory following the procedure described above. In Comparative Example 2, a solution of the 50/50 MPP-DMP copolymer of Preparative Example 1 at 16 wt. % in NMP was prepared and cast into a membrane following the same procedure used to prepare Comparative Example 2. SEM images of these two membranes are presented in FIG. 1, and data for these membranes is summarized in Table 4. In Table 4, "cP" refers to centipoise, "nm" refers to nanometers, "hr" refers to hour, and "atm" refers to atmosphere (pressure).

Example 2, and cross-sections of Comparative Example 1. As can be seen from the SEM images, both membranes were porous, and neither membrane had a non-porous surface layer.

The surface appearance of the membrane of Comparative Example 2 compares very well to the Comparative Example 1, the digital image analysis confirms that Comparative Example 2 achieves a very similar pore size distribution in the absence of PVP, which is a pore-forming agent.

The cross-sectional morphology of Comparative Example 2 shows the formation of the desired co-continuous or "sponge" morphology to a large extent even in the absence of the PVP additive. The solution viscosity of Comparative Example 2 also compares well to that of the Comparative Example 1 which relies on addition of PVP to create a casting dope of suitable viscosity.

The water flow data indicates that the pores visible at the surface of Comparative Example 2 via SEM do indeed connect throughout the sample to allow the passage of water in a manner at least equivalent to that of Comparative Example 1, which is rather remarkable in the absence of the PVP additive. These results demonstrate that MPP-DMP copolymers of sufficiently high IV are capable of forming well-structured membranes via phase-inversion casting with solvents such as NMP without requiring the use of fugitive pore-forming additives such as PVP. The contact angle of Comparative Example 2 remains higher than that of Comparative Example 1 despite the absence of PVP.

Preparative Examples 11-13: Preparation of MPP-DMP Copolymers with 20, 50, and 80 Mole Percent MPP MPP-DMP copolymers with 20, 50, and 80 mole percent MPP were prepared in a 1-gallon reactor using the same methods as in Preparative Examples 2-4. The dried copolymers were characterized for molecular weight distribution as described above for Preparative Examples 2-4. The results for Preparative Examples 11-13 are summarized in Table 7. "Mn" refers to number average molecular weight, "Mw" refers to weight average molecular weight, "D" refers to polydispersity, and "g" refers to grams.

TABLE 4

Membrane Properties of Comparative Examples 1 and 2

| | Dope Solution | | Membrane Properties | | | | |
|---|---|---|---|---|---|---|---|
| Ex. | Polymer (wt %) | Viscosity (cP at 20° C.) | Surface Pore Size Distribution (nm) | Mean Cross-sectional thickness (μm) | Extent of Macrovoid Formation in cross-section | Membrane Water Flow, (g/hr · atm) | Contact angle, water |
| CE 1 | 16% PES + 8% PVP | 3,065 | 7.3 ± 1.9 | 128 | high | 25 | 70 |
| CE 2 | 16% Ex. 1 | 3,533 | 9.3 ± 3.2 | 40 | low | 39 | 82 |

The membrane-forming compositions had a first solvent, NMP, but not a second solvent having two to eight carbon atoms. When a second solvent is not present in the membrane-forming composition, a substantially non-porous surface layer is not formed. FIG. 1 shows scanning electron microscopy (SEM) images of the asymmetric membrane surfaces and cross-sections of Comparative Examples 1 and 2. The images, clockwise from the upper left corner are of the surface of Comparative Example 1, the surface of Comparative Example 2, cross-sections of Comparative

TABLE 7

Characterization of MPP-DMP Copolymers of Preparative Examples 11-13

| Ex. No. | MPP/DMP (mole/mole) | GPC Mn (g/mole) | GPC Mw (g/mole) | GPC D (Mw/Mn) | IV in CHCl$_3$ (dL/g) |
|---|---|---|---|---|---|
| 11 | 20/80 | 63,010 | 210,800 | 3.3 | 1.14 |
| 11a | 20/80 | 49,940 | 199,700 | 4.0 | 1.08 |

TABLE 7-continued

Characterization of MPP-DMP Copolymers of Preparative Examples 11-13

| Ex. No. | MPP/DMP (mole/mole) | GPC Mn (g/mole) | GPC Mw (g/mole) | GPC D (Mw/Mn) | IV in CHCl₃ (dL/g) |
|---|---|---|---|---|---|
| 12 | 50/50 | 42,460 | 216,200 | 5.1 | 0.98 |
| 13 | 80/20 | 36,490 | 310,700 | 8.5 | 1.08 |

Examples 18-20 and Comparative Example 3: Porous Asymmetric Hollow Fibers

Figure 2:
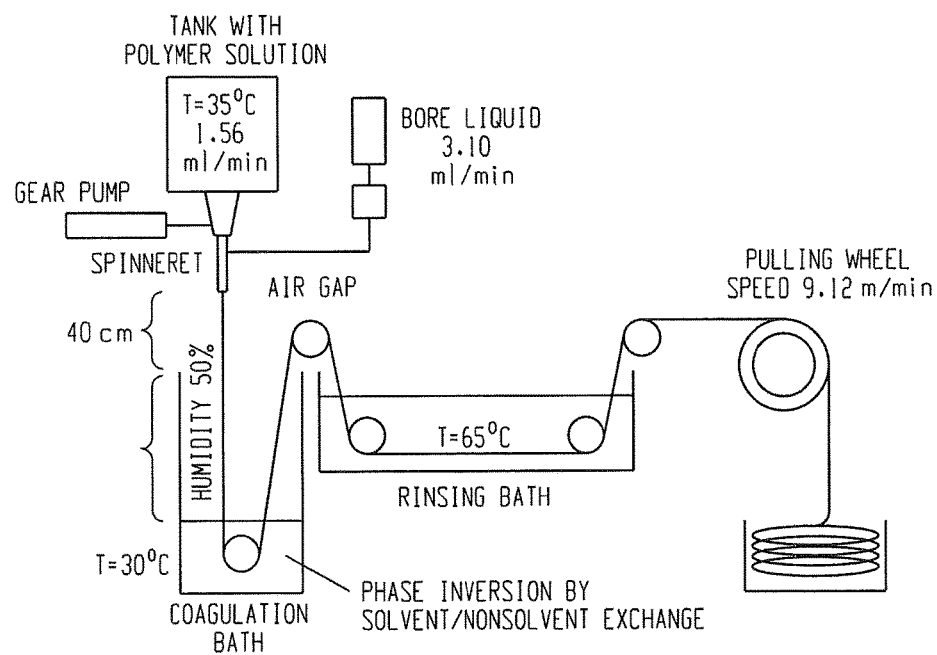
FIG. 2 is a diagram of a laboratory-scale, dry-wet immersion precipitation spinning apparatus.

Porous asymmetric hollow fibers were spun from the membrane-forming compositions (dope solutions) of Examples 18-20 (containing the MPP-DMP copolymers of Examples 11-13, respectively), and Comparative Example 3 (containing ULTRASON™ E 6020 P and PVP), using the methods disclosed in International Application Publication WO 2013/131848. A diagram of the laboratory scale, dry-wet immersion precipitation spinning apparatus used is provided in FIG. 2. The membrane-forming polymers were dissolved in NMP at the concentrations listed in the first row of Table 10. ULTRASON™ 6020P (BASF) was maintained for 24 hrs. under vacuum to remove all moisture prior to mixing. The polymers and NMP were mixed until a homogenous solution was reached. Before adding the dope solutions into the spinning apparatus, the compositions were filtered through a 25 μm metal mesh to remove any residual undissolved particles. The dope solutions were degassed for 24 hrs. before the spinning. The bore fluid for each example was 30 wt % NMP and 70 wt % deionized water, which was degassed for 24 hrs. before use.

The dope solutions and bore fluid were simultaneously pumped through a double orifice spinneret. After passing the air gap, the fibers were immersed in the coagulation bath. The take-up velocity was controlled by a pulling wheel, which enabled also stretching of the fiber. A solution of MPP-DMP copolymer according to Example 12 of 18% by weight in NMP was successfully spun into hollow fibers to produce Example 18 using the same apparatus and the same conditions as used to prepare Comparative Example 3.

Figure 3:
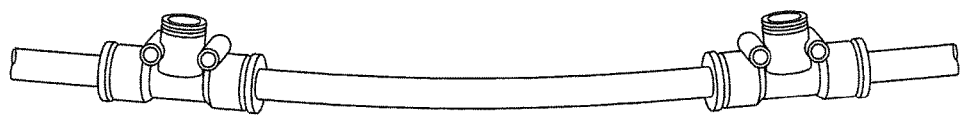
FIG. 3 shows a laboratory-scale hollow fiber membrane separation module.

A summary of the fiber spinning conditions, spinneret geometry, and measured dimensions of the dried hollow fibers is shown in Table 10. The coagulation bath temperature was 22° C. For Comparative Example 3, the rinsing bath was held at 65° C. according to the example in the '848 application, which is understood to be intended for rinsing away excess PVP from the surface of the hollow fiber membrane. For Examples 18-20, which were prepared from the 20/80, 50/50, and 80/20 MPP-PPE copolymers, respectively, the rinsing bath was held at 30° C. for safety in handling the fibers and because there was no PVP to be washed away. The take-up velocity was adjusted such that the wall thickness of the two hollow fiber samples was in the range of 40-60 micrometers. The post treatment process for the hollow fiber produced was as described in the '848 application. The fibers were washed in 70° C. purified water for 3 hrs. After 1.5 h the water was exchanged. Afterwards the fibers were rinsed for another 24 hrs. in water at tap temperature. After the rinsing step, the fibers were hung in the lab to dry in air at ambient temperature. The resulting hollow fibers were fabricated into laboratory-scale hollow fiber separation modules, a photo of which is provided in FIG. 3.

Based on the finding that the membrane-forming polymer solution viscosity in NMP was very sensitive to the amount of MPP co-monomer in the copolymer, the concentration of each polymer was adjusted so as to yield an essentially constant solution viscosity of just over 3,000 cP. As a result there is a direct correlation between the level of MPP co-monomer in the copolymer and the mass of PPE per unit length of fiber, with Example 19 providing the most efficient use of polymer under the same spinning conditions. The fiber wall thickness was also maintained to a greater extent in Ex. 19, suggesting that with further optimization of fiber spinning conditions to reduce the wall thickness, a greater reduction in mass per unit length can be realized.

TABLE 10

Summary of Process Conditions for Hollow Fiber Spinning and Fiber Properties

| Examples | Comparative Example 3 | Ex. 18 | Ex. 19 | Ex. 20 |
|---|---|---|---|---|
| Polymer Concentrations in NMP (wt %) | 14% 6020P/ 5% PVP K30/ 2% PVP K90/ 3% H₂O | 18% Ex. 12 (50/50 MPP-DMP) | 14% Ex. 11 (20/80 MPP-DMP) | 20% Ex. 13 (80/20 MPP-DMP) |
| Viscosity (cP at 35° C.) | | 3270 | 3091 | 3137 |
| Dope temp. [° C.] | 35 | 35 | 35 | 35 |
| Die temp. [° C.] | — | — | — | — |
| Shaft temp. [° C.] | ~22 | ~30 | ~30 | ~22 |
| Shaft humidity [%] | 50 | 60 | 60-65 | 60 |
| Room humidity [%] | 35 | 40 | 40 | 40 |
| 1ˢᵗ bath temp. [° C.] | 30 | 30 | 30 | 30 |
| 2ⁿᵈ bath temp. [° C.] | 65 | 30 | 30 | 30 |
| Air Gap [cm] | 100 | 100 | 100 | 100 |
| Dope extrusion rate [mL/min] | 1.56 | 1.56 | 1.56 | 1.56 |
| Bore extrusion rate [mL/min] | 3.1 | 3.1 | 3.1 | 3.1 |
| Take up velocity [m/min] | 9.12 | 7.04 | 7.07 | 7.00 |
| Spinneret dimensions | | | | |
| Inner diameter [mm] | 0.4 | 0.4 | 0.4 | 0.4 |
| Outer diameter [mm] | 1.12 | 1.12 | 1.12 | 1.12 |

TABLE 10-continued

Summary of Process Conditions for Hollow Fiber Spinning and Fiber Properties

| Examples | Comparative Example 3 | Ex. 18 | Ex. 19 | Ex. 20 |
|---|---|---|---|---|
| Dry hollow fiber dimensions by SEM | | | | |
| Inner diameter [μm] | 445 | 605 | 510 | 605 |
| Wall thickness [μm] | 59 | 41 | 47 | 23 |
| Mass per km (g) | 25.9 | 40.2 | 31.1 | 43.3 |

The data in Table 10 show that MPP-DMP copolymers having far less than 50 mole percent MPP repeat units, for example 20 mole percent MPP repeat units as in Example 11, provides hollow fibers (Example 19) having an advantageous reduction in the mass of resin per unit length of fiber over hollow fibers (Examples 18 and 20) fabricated from copolymers having 50 mole percent or more MPP repeat units (Examples 12 and 13). Examples 18-20 also show that MPP-DMP copolymers of fairly broad molecular weight distribution, with D values of greater than or equal to 3 and less than or equal to 9, provide yield high-quality hollow fiber membranes.

Preparative Examples 21-23: Repeat Preparation of MPP-DMP Copolymers with 20, 50, and 80 Mole % MPP MPP-DMP copolymers with 20, 50, and 80 mole % MPP were prepared in a 1-gallon reactor using the same methods as in Preparative Examples 2-4 and 6-8. The dried polymers were characterized for molecular weight distribution as described above. The results are summarized in Table 11.

TABLE 11

Characterization of MPP-DMP Copolymers of Preparative Examples 21-23

| Ex. No. | MPP/DMP (mole/mole) | GPC Mn (g/mole) | GPC Mw (g/mole) | GPC D (Mw/Mn) | IV in CHCl$_3$ (dL/g) |
|---|---|---|---|---|---|
| PE 21 | 20/80 | 63,010 | 210,800 | 3.3 | 1.14 |
| PE 22 | 50/50 | 42,460 | 216,200 | 5.1 | 0.98 |
| PE 23 | 80/20 | 36,490 | 310,700 | 8.5 | 1.08 |

Example 24-26: Dense-Skinned Asymmetric Hollow Fiber Membranes

The MPP-DMP copolymers of Preparative Examples 11-13 are spun into hollow fiber membranes according to the methods described in Examples 18-20 and Comparative Example 3, except that a second solvent (THF) is added to the NMP dope solutions and the concentration of the polymers are increased to approach the gel point at the selected phase-inversion temperature. For example the dope solution can be prepared from 20 wt % of the 20/80 MPP-DMP copolymer of Preparative Example 6, 5 wt % THF and 75 wt % NMP, and the bore fluid can be a mixture of 80 wt % NMP and 20 wt % water. Hollow fiber membrane test modules are prepared by cutting a bundle of 30 hollow fibers into 25-cm lengths and sealing them at each end into a short length of stainless steel tubing using a two-part polyurethane thermoset resin. After the polyurethane is cured, the ends of the polyurethane plug are cut away with a fine saw to expose the ends of the hollow fibers and two steel tubing end-caps connecting the fibers are clamped into a tubular stainless steel over-sleeve to form the test module. The steel over-sleeve is fitted with connectors to allow a gas stream of one or more components under pressure of 5-10 bar to be fed to the shell side of the module, and collection of a permeate gas stream at the ends of the module. The hollow fibers are optionally dip-coated using a solution of polydimethylsiloxane (PDMS) to seal surface defects prior to assembly into the test module.

The feed and permeate streams are monitored by digital mass-flow meters and analyzed for instantaneous composition by gas chromatography in order to calculate the gas flux and separation factors for the hollow fibers. The test modules are optionally placed into a forced-air oven to allow testing at elevated temperatures. Gases such as hydrogen or helium are used to set benchmarks for gas flux prior to measurements made with gases of interest such as oxygen, nitrogen, methane, carbon dioxide, optionally as binary mixtures.

Examples 24-26 and Comparative Examples 4-6: Gas Permeability Measurements and Estimation of Perm-Selectivity for MPP-DMP Copolymers The MPP-DMP copolymers were dried overnight under vacuum at 120° C. The dried polymer was added to 8 g of chloroform in a 20-mL vial to create a 2.5 wt % polymer solution and stirred for 4 hrs to dissolve the polymer completely. A glove bag with a saturated chloroform atmosphere and leveled glass plate was prepared for casting. In the glove bag, each solution was poured into a glass ring. After 15 hours the samples were transferred to an oven and dried overnight under vacuum at 60° C. to remove residual solvent.

Gas permeation tests were completed using a constant volume system wherein the permeability was calculated based on the rate "dp/dt". The downstream pressure begins at vacuum and there is no sweep gas. Each sample was tested under the same conditions for accurate comparison: 35° C. and 2 atm. Transport properties of four gases were measured in the following order: $O_2$, $N_2$, $CH_4$ and $CO_2$. Since the measurements were conducted in single gas mode, only ideal selectivity ratios for the gas pairs of greater commercial interest were measured $O_2/N_2$ and $CO_2/CH_4$.

Membrane areas were measured using ImageJ software for more accurate readings, since area was a very critical parameter for flux calculations. In this study, the average area was 0.70 cm$^2$ and the average thickness 78 μm.

To reduce system errors, leak tests were conducted before each measurement. Also, an extended gas evacuation time (16-24 hrs.) was used to ensure that all residual gas was removed before the next measurement. Three readings from the control software were averaged for each measurement to confirm that the permeability was truly at steady-state. Permeation and ideal selectivity results are summarized Tables 14 and 15, respectively.

TABLE 14

Relative Permeability of Selected Gases in Membranes (barrer)

| Ex. | Poly. | MPP/DMP (mole/mole) | Temp. (° C.) | Pres. (atm) | $N_2$ | $CH_4$ | $CO_2$ | $O_2$ |
|---|---|---|---|---|---|---|---|---|
| CE 4 | PES[a,b] | n/a | 25, 35 | 1, 10 | 0.0974 | 0.1 | 2.8 | 0.63 |
| CE 5 | PSU[c] | n/a | 30 | 1 | 0.2 | 0.21 | 4.9 | 1.2 |
| CE 6 | PPE[c,d] | 0/100 | 30 | 1 | 3.5 | 4.1 | 65.5 | 14.6 |
| E 24 | PE 21 | 20/80 | 35 | 2 | 3.6 | 4.83 | 77.37 | 16.7 |
| E 25 | PE 22 | 50/50 | 35 | 2 | 2.4 | 3.16 | 53.54 | 12.1 |
| E 26 | PE 23 | 80/20 | 35 | 2 | 1.54 | 2.13 | 40.44 | 8.29 |

[a]Polyethersulfone, Haraya, *JMS*, 71 (1992), p. 13.
[b]Polysulfone, Paul, *JAPS*, 33 (1987), p. 1823.
[c]Robeson, *Curr. Opin. Solid State Mater. Sci.*, 4 (1999), p. 549.
[d]Poly(2,6-dimethyl-4-phenylene ether).

TABLE 15

Ideal Selectivities of Selected Gases

| Ex. | Poly. | MPP/DMP (mole/mole) | Temp. (° C.) | Pres. (atm) | $O_2/N_2$ | $CO_2/CH_4$ |
|---|---|---|---|---|---|---|
| CE 4 | PES[a,b] | n/a | 25, 35 | 1, 10 | 6.5 | 28.0 |
| CE 5 | PSU[c] | n/a | 30 | 1 | 6.0 | 23.3 |
| CE 6 | PPE[c,d] | 0/100 | 30 | 1 | 4.2 | 16.0 |
| E 24 | PE 21 | 20/80 | 35 | 2 | 4.6 | 16.0 |
| E 25 | PE 22 | 50/50 | 35 | 2 | 5.0 | 16.9 |
| E 26 | PE 23 | 80/20 | 35 | 2 | 5.4 | 19.0 |

[a]Polyethersulfone, Haraya, *JMS*, 71 (1992), p. 13.
[b]Polysulfone, Paul, *JAPS*, 33 (1987), p. 1823.
[c]Robeson, *Curr. Opin. Solid State Mater. Sci.*, 4 (1999), p. 549.
[d]Poly(2,6-dimethyl-4-phenylene ether).

Published literature values for gas permeability and ideal selectivity data for PES, PSU, and poly(2,6-dimethyl-4-phenylene ether), which are used in commercial gas separation membranes, are provided in Comparative Examples 4-6. The published permeability values for poly(2,6-dimethyl-4-phenylene ether) are at least an order of magnitude higher than those reported for the polysulfone polymers PES and PSU, while the ideal gas selectivity of these polymers for pairs of commercial interest such as $O_2/N_2$ are similar. These data show that the favorable combination of high permeability and selectivity of poly(2,6-dimethyl-4-phenylene ether) are not sacrificed in the MPP-DMP copolymers of Examples 24-26. The MPP-DMP copolymers have the added benefit of being soluble in water-miscible polar aprotic solvents such as NMP, which are preferred for fiber-spinning. In particular, the composition of Example 24 offers a combination of both higher permeability than poly(2,6-dimethyl-4-phenylene ether) with equal or better ideal gas selectivity for $O_2/N_2$ and $CO_2/CH_4$ pairs.

Examples 27-32

Solution Viscosity of MPP-DMP Copolymer in NMP/THF Mixtures

Solution viscosities of the 20/80 MPP-DMP copolymer of Example 21 and the 50/50 MPP-DMP of Example 22 in NMP and NMP/THF mixtures are summarized in Table. 14. The data verify that MPP-DMP copolymers having a low concentration of MPP comonomer, for example 50 mole percent as in Example 21 and 20 mole percent as in Example 22, still provide a sufficiently high solution viscosity in the presence of a volatile co-solvent such as THF. Advantageously, MPP-DMP copolymers exhibit enhanced solubility over poly(2,6-dimethyl-4-phenylene ether) homopolymers.

These data show that MPP-DMP copolymers also provide adequate solution viscosity at relatively low concentrations for preparing membranes.

TABLE 14

Viscosity of Polymer Solutions Containing THF as Co-solvent.

| Ex. | Polymer | THF/NMP Weight Ratio | Viscosity (cP at 20 C.) |
|---|---|---|---|
| 27 | 16 wt % Ex. 21 | 0/100 | 8,552 |
| 28 | 16 wt % Ex. 21 | 5/95 | 8,023 |
| 29 | 16 wt % Ex. 21 | 10/90 | 6,699 |
| 30 | 16 wt % Ex. 22 | 0/100 | 2,797 |
| 31 | 16 wt % Ex. 22 | 5/95 | 2,532 |
| 32 | 16 wt % Ex. 22 | 10/90 | 2,112 |

The use of the terms "a" and "an" and "the" and similar referents in the context of describing the invention (especially in the context of the following claims) is to be construed to cover both the singular and the plural, unless otherwise indicated herein or clearly contradicted by context. "Or" means "and/or." The endpoints of all ranges directed to the same component or property are inclusive and independently combinable. Disclosure of a narrower range or more specific group in addition to a broader range is not a disclaimer of the broader range or larger group. All ranges disclosed herein are inclusive of the endpoints, and the endpoints are independently combinable with each other. The terms "first" and "second" and the like, as used herein do not denote any order, quantity, or importance, but are only used to distinguish one element from another. "Comprises" as used herein includes embodiments "consisting essentially of" or "consisting of" the listed elements.

Unless defined otherwise, technical and scientific terms used herein have the same meaning as is commonly understood by one of skill in the art to which this invention belongs. A "combination" is inclusive of blends, mixtures, alloys, reaction products, and the like.

As used herein, the term "hydrocarbyl" refers broadly to a moiety having an open valence, comprising carbon and hydrogen, optionally with 1 to 3 heteroatoms, for example, oxygen, nitrogen, halogen, silicon, sulfur, or a combination thereof. Unless indicated otherwise, the hydrocarbyl group can be unsubstituted or substituted, provided that the substitution does not significantly adversely affect synthesis, stability, or use of the compound. The term "substituted" as used herein means that at least one hydrogen on a hydrocarbyl group is replaced with another group (substituent) that contains a heteroatom selected from nitrogen, oxygen, sulfur, halogen, silicon, or a combination thereof, provided that the normal valence of any atom is not exceeded. For example, when the substituent is oxo (i.e. "=O"), then two hydrogens on a designated atom are replaced by the oxo group. Combinations of substituents and/or variables are permissible provided that the substitutions do not significantly adversely affect the synthesis, stability or use of the compound.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. An asymmetric membrane having a substantially non-porous surface layer made by a method comprising:
   dissolving a poly(phenylene ether) copolymer having an intrinsic viscosity of 0.7 to 1.5 deciliters per gram, measured in chloroform at 25° C., and a weight average molecular weight of 100,000 to 500,000 daltons, measured by gel permeation chromatography against polystyrene standards, in a solvent mixture comprising a first solvent and a second solvent to provide a membrane-forming composition;
   phase-inverting the membrane-forming composition in a first non-solvent to form the membrane having a substantially non-porous surface layer;
   wherein the first solvent is a water-miscible polar aprotic solvent, and the second solvent is a polar solvent having two to eight carbon atoms.

2. The asymmetric membrane of claim 1, wherein the method further comprises washing the membrane in a second non-solvent and drying the membrane.

3. The asymmetric membrane of claim 1, wherein the poly(phenylene ether) copolymer comprises first and second repeat units having the structure:

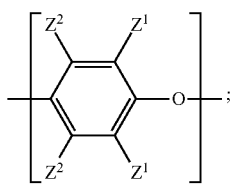

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein at least two carbon atoms separate the halogen and oxygen atoms;
wherein each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy, wherein at least two carbon atoms separate the halogen and oxygen atoms; and
wherein the first and second repeat units are different.

4. The asymmetric membrane of claim 1, wherein the poly(phenylene ether) copolymer comprises, consists essentially of, or consists of:
   80 to 20 mole percent repeat units derived from 2,6-dimethylphenol; and
   20 to 80 mole percent repeat units derived from a first monohydric phenol having the structure

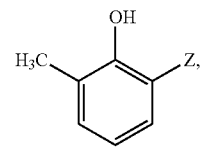

wherein Z is $C_1$-$C_{12}$ alkyl or cycloalkyl, or a monovalent radical having the structure

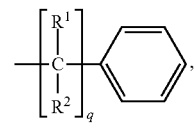

wherein q is 0 or 1, and $R^1$ and $R^2$ are independently hydrogen or $C_1$-$C_6$ alkyl;
wherein the poly(phenylene ether) copolymer has an intrinsic viscosity of 0.7 to 1.5 deciliters per gram, measured in chloroform at 25° C.

5. The asymmetric membrane of claim 1, in which a hydrophilic polymer is not present.

6. The asymmetric membrane of claim 5, wherein the hydrophilic polymer is poly(vinyl pyrrolidone), poly(oxazoline), poly(ethylene glycol), poly(propylene glycol), a poly(ethylene glycol) monoether or monoester, a poly(propylene glycol) monoether or monoester, a block copolymer of poly(ethylene glycol) and poly(propylene glycol), or a combination comprising at least one of the foregoing.

7. The asymmetric membrane of claim 4, wherein the first monohydric phenol is 2-methyl-6-phenylphenol.

8. The asymmetric membrane of claim 1, wherein the solubility of the poly(phenylene ether) copolymer in the water-miscible polar aprotic solvent is 50 to 400 grams per kilogram at 25° C., based on the combined weight of the poly(phenylene ether) copolymer and the solvent.

9. The asymmetric membrane of claim 1, further comprising a poly(phenylene ether) homopolymer, polyethersulfone, polysulfone, polyphenylsulfone, or a combination comprising at least one of the foregoing.

10. A gas separation module comprising the asymmetric membrane of claim 1.

11. The gas separation module of claim 10, wherein the asymmetric membrane comprises an asymmetric hollow fiber.

12. The gas separation module of claim 11, comprising a bundle of 10 to 10,000 of the asymmetric hollow fibers.

13. The gas separation module of claim 12, comprising a plurality of the bundles.

14. The gas separation module of claim 12, wherein the gas separation module comprises:

an enclosure configured to contain the bundle, the enclosure having an outlet adapted for withdrawing a permeate fluid;

a first encasement comprising a thermoset or a thermoplastic polymeric material and located at a first end of the bundle, arranged such that the hollow fiber membranes are embedded in the first encasement and communicate through the first encasement and are open on an outer face of the first encasement;

a second encasement comprising a thermoset or a thermoplastic polymeric material and located at a second end of the bundle opposite the first end of the bundle, arranged such that the hollow fiber membranes are embedded in the second encasement and communicate through the second encasement and are open on an outer face of the second encasement;

a first end cap arranged and adapted for attaching and sealing to the first end of the bundle or enclosures at or near the first encasement;

a second end cap arranged and adapted for attaching and sealing to the second end of the bundle or enclosures at or near the second encasement;

an inlet for introducing a fluid mixture to be separated into bores of the hollow fiber membranes at the first encasement; and an outlet for withdrawing a retentate fluid from the bores for the hollow fiber membranes at the second encasement.

15. The gas separation module of claim 10, wherein the asymmetric membrane is a form of a sheet.

16. The gas separation module of claim 10, wherein the asymmetric membrane is in a form of a spiral.

17. The gas separation module of claim 15, wherein gas separation module comprises:
   a hollow core comprising perforations;
   the asymmetric membrane wound around the core; and
   a spacer disposed adjacent to the asymmetric membrane.

18. A method of forming an asymmetric membrane having a non-porous surface layer comprising:
   dissolving a poly(phenylene ether) copolymer having an intrinsic viscosity of 0.7 to 1.5 deciliters per gram, measured in chloroform at 25° C. in a solvent mixture comprising a first solvent and a second solvent to make a membrane-forming composition, wherein the first solvent is a water-miscible polar aprotic solvent, and the second solvent is a polar solvent having two to eight carbon atoms; and
   phase inverting the membrane-forming composition in a first non-solvent to form the membrane.

19. The method of claim 18, further comprising washing the asymmetric membrane in a second non-solvent.

20. The method of claim 18, further comprising drying the asymmetric membrane.

21. The asymmetric membrane of claim 1, wherein the intrinsic viscosity is 0.8 to 1.5 deciliters per gram.

* * * * *